United States Patent [19]

Klose et al.

[11] 4,355,890
[45] Oct. 26, 1982

[54] MICROFICHE RECORDING SYSTEM

[75] Inventors: Peter H. Klose, Troy; Herbert C. Ovshinsky, Oak Park, both of Mich.

[73] Assignee: Energy Conversion Devices, Inc., Troy, Mich.

[21] Appl. No.: 227,959

[22] Filed: Jan. 23, 1981

[51] Int. Cl.³ .................. G03B 27/44; G03B 27/62; G03B 27/64
[52] U.S. Cl. ........................... 355/54; 355/64; 355/76
[58] Field of Search ............... 355/5, 19, 27, 40–43, 355/64, 65, 53, 54, 95, 73, 76

[56] References Cited

U.S. PATENT DOCUMENTS

| | | | |
|---|---|---|---|
| 3,972,610 | 8/1976 | Gross | 355/95 |
| 4,074,935 | 2/1978 | Spence-Bate | 355/46 |
| 4,080,065 | 3/1978 | Spence-Bate | 355/54 |
| 4,123,157 | 10/1978 | Klose et al. | 355/43 |
| 4,176,948 | 12/1979 | Spence-Bate | 355/53 |
| 4,185,913 | 1/1980 | Ammann et al. | 355/43 |
| 4,245,906 | 1/1981 | Froelich | 355/43 |

Primary Examiner—Richard A. Wintercorn
Attorney, Agent, or Firm—Lawrence G. Norris

[57] ABSTRACT

An improved annotatable microfiche film card archival recording system utilizes an intermediate film strip on a movable film head to transfer an image from an initial imaging station to a transfer station where the image on the intermediate film strip is transferred to the microfiche film card. There is provided an optical train including a pair of downwardly facing, inclined and horizontally spaced mirrors at the imaging station, the first of which mirror receives upwardly directed light reflected from hard copy. This mirror arrangement, cooperating with a horizontal film head movement in a direction transverse to the mirror spacing, minimizes the height and width requirements of the equipment. A ball joint supported backing means supporting the entire area of the active portion of the film improves image resolution. Controlled upward displacement of only the image-receiving portion of the intermediate film strip during image transfer allows full utilization of the peripheral areas of the microfiche film card when supported on a flange support frame. Controlled downward displacement of the intermediate film at the imaging station allows an intermediate film backing element and a microfiche film card image projection illuminator to be activated by a common lifting means. A selectively interposable corrector lens optimizes image resolution of this projection.

16 Claims, 40 Drawing Figures

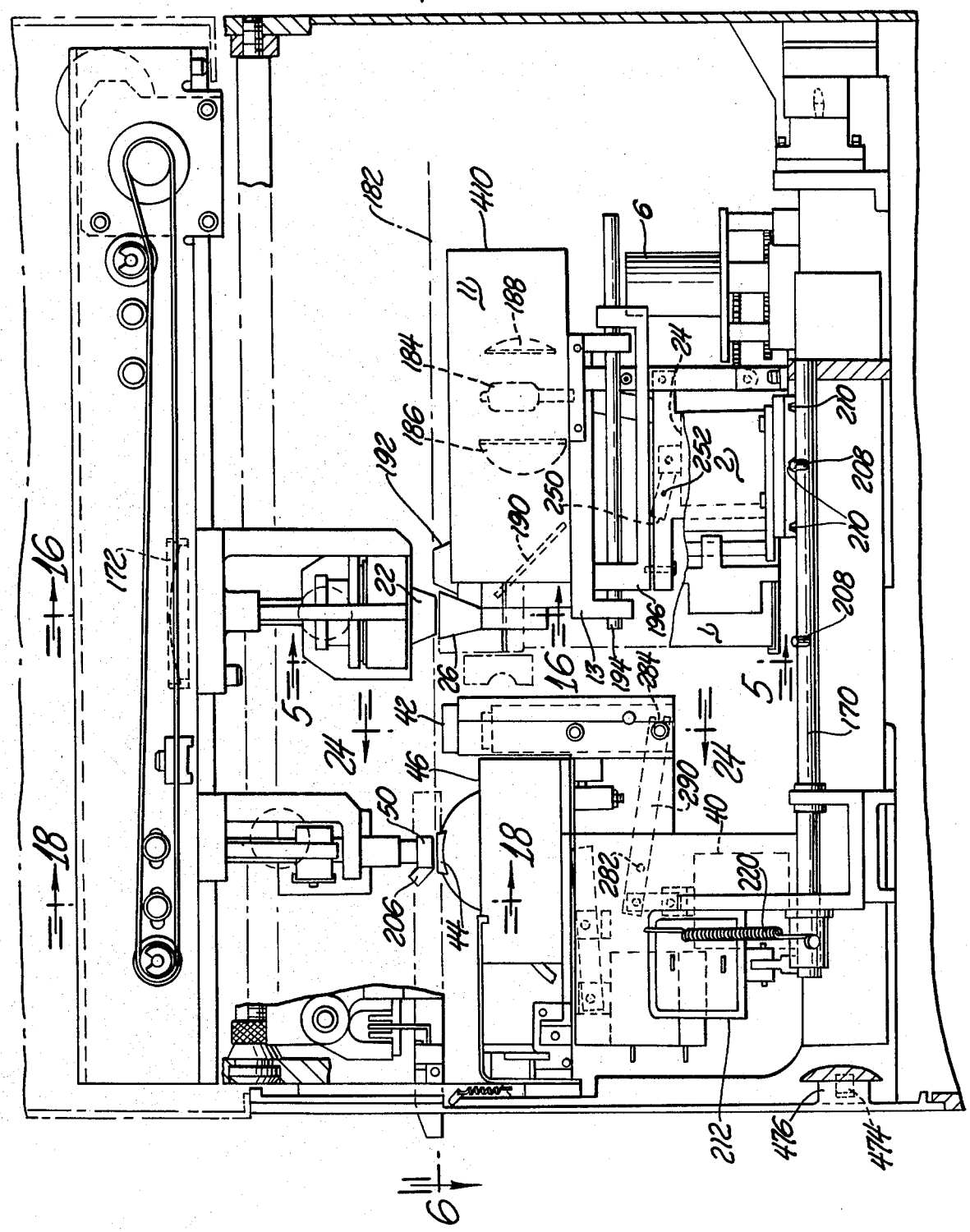

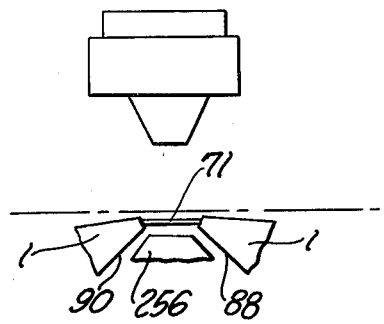
Fig. 15a
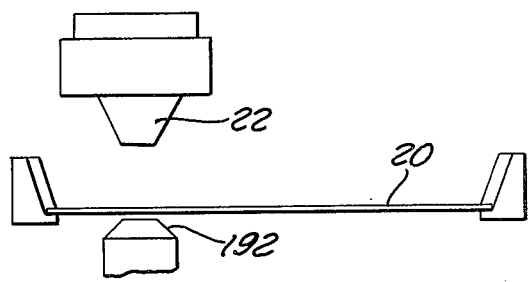
Fig. 15f
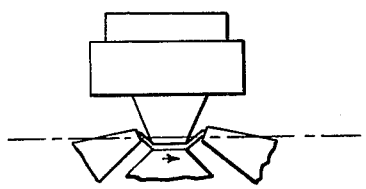
Fig. 15b
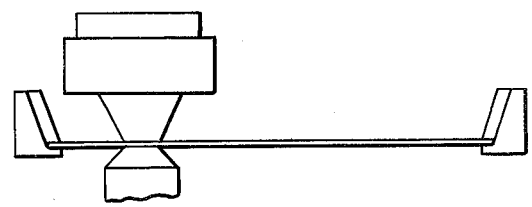
Fig. 15g
Fig. 15c
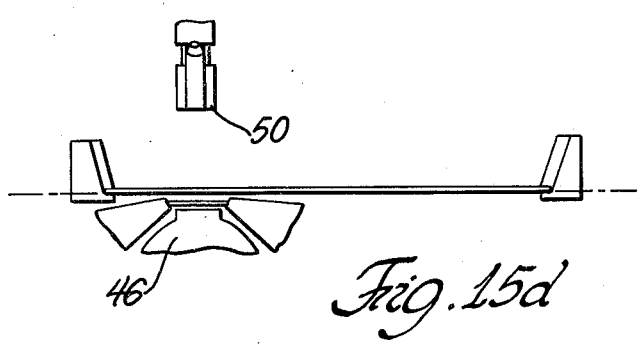
Fig. 15d
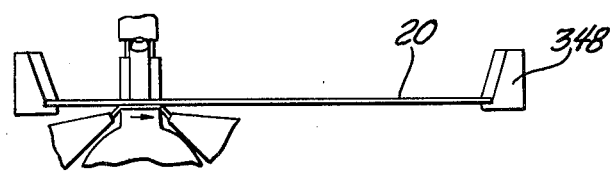
Fig. 15e
Fig. 15

MICROFICHE RECORDING SYSTEM

BACKGROUND OF THE INVENTION

The present invention relates to an apparatus for producing annotatable archival records on frames of a microfiche film card by employing an intermediate film strip to carry an intermediate image of hard copy. The film strip is carried by a movable film head having supply and takeup reels for the film strip, and which is moved between an imaging station and an image transfer station.

There is disclosed in U.S. Pat. No. 4,123,157, granted Oct. 31, 1978 to Klose ad Ovshinsky an archival hard copy microfiche recording system which reflects light off of a document placed on a document receiving platform and projects an image of it in greatly reduced form onto an initially transparent intermediae dry silver film strip carried by a film head unit. The film strip is dispensed from a cassette mounted on the film head, and is passed by film advancing and takeup means to an imaging region where a selected area of the film strip to be exposed can receive the projected light image. Exposure is controlled by a mechanical shutter. After exposure, a hot shoe integral with the film head is extended to press against the exposed area of the film, causing development of the image so as to form an opaque image in the exposed areas thereof. The film head is then moved to an image transfer station, where the image on the dry silver film is replicated on a positive initially opaque microfiche film card of the photo-developing type (See U.S. Pat. No. 4,137,078 issued June 30, 1979 to Izu and Ovshinsky). The microfiche card is held indexed on a movable carriage so that a predesignated frame of the card receives the image on the intermediate film. Image transfer is accomplished by a plunger pressing the film card and the intermediate film strip together between the output window of a flash lamp assembly and a backing plate. The flash lamp is then energized to direct light through the intermediate film, immediately rendering transparent the previously opaque areas struck by the high intensity flash lamp light on the selected frame of the microfiche film card.

The microfiche card may be examined via a "read" mode of the system. With the film head positioned away from the imaging lens, the microfiche film card carriage, which is accurately locatable in x and y directions by means of an indexing system, is moved on a track to a station under the lens. An illumination system is moved next to the microfiche film card carriage and then the chosen frame of the card is projected back to the document receiving area.

The system also possesses the capability of "annotating" or "updating" existing records stored on the microfiche film. This arises from the nature of the two film systems used. The intermediate film is of the reversal type; dark areas on the chosen hard copy replicate as transparent areas upon development, and light areas replicate as opaque. Hard copy consisting of black lettering on a white page will thus replicate on the intermediate film as an opaque rectangle with transparent letters. The microfiche film, however, is an initially opaque photodeveloping positive film which is rendered irreversibly transparent where struck by high intensity light during flash exposure. Thus, dark markings on the original document replicate as irreversibly transparent images on an otherwise still opaque microfiche film frame. These remaining opaque regions on the microfiche film remain convertible in that they can be rendered transparent by a subsequent flash exposure. It is this aspect of the microfiche film that allows for updating of microfiche records.

Thus, if a copy of a document is imaged on a microfiche film card frame where the indicia on the document are dark lines on a light background, these dark lines are now stored as irreversible clear lines on the microfiche film card. To update the microfiche film card with new entries in a specified still convertible area of a microfiche film card frame one prepares on a fresh area of intermediate film a new image consisting of the new entries only. This is accomplished by using as a source for the new image a dark-line record on a white background placed on the document receiving platform, e.g. typewritten black text on white paper. The new image, consisting after development solely of transparent new entries on an otherwise opaque imaging area, is then replicated at the transfer station onto the microfiche film card frame. These new entries are thus replicated as additional irreversible clear indicia on the selected frame. Proper registry of the new record is achieved by using the "read" mode of the system to assist in orienting the new entries on the document receiving platform before the intermediate film is exposed to receive the new image. Here an image of the chosen frame to be updated is projected back onto the document receiving platform, using the "read" mode previously described. A white sheet of paper bearing the new record indicia is then placed on the document receiving platform and moved around until the new indicia are properly positioned with respect to the projected image of the microfiche film card. The frame is now updated by carrying out a conventional "record" cycle, i.e., the microfiche film card is returned to the transfer station, the film head is moved to the imaging station, whereupon the image of the new record indicia is projected, exposed, developed, and replicated onto the microfiche film card frame at the transfer station.

The system as disclosed in U.S. Pat. No. 4,123,157 suffered from several limitations. An offset mirror system was employed to project the image of the hard copy upwards onto the transfer film. This necessitated the use of one mirror facing upwards, giving rise to the necessity for periodic dust removal. One of the objects of this invention is to eliminate this dust problem. The intermediate film strip was not fully supported in the imaging region thereof at the imaging station, with the result that system vibrations caused the images on the intermediate film to suffer from loss of resolution. The use of a mechanical shutter produced severe local vibrations which aggravated this situation. A further object of this invention is the elimination of such vibration problems.

This system was wasteful of cabinet space and required a cabinet which was undesirably wide so that it occupied too much useful table space in a direction across the front of the table. This result was, in part, due to the fact that the two offset mirrors were horizontally spaced in a direction parallel to the front of the cabinet and that the film head was moved between the imaging and image transfer station in a direction which was a parallel prolongation of the mirror offset axis. This mirror arrangement directed the hard copy reflected light upward and to the intermediate film, which required that the system mechanical apparatus was necessarily located high in the enclosing cabinet, making the apparatus inconvenient to service, and also thereby wasting a significant portion of the cabinet volume in the form of a substantially unoccupied region below the apparatus. A further object of this invention is to reduce wasted system volume and improve access thereto.

The system had no provision for compensating for the different standoff distances between the imaging lens and the emulsion layer on the intermediate film and the image layer on the significantly thicker microfiche film requiring different focussing conditions. Focus was thus a compromise, and loss of resolution resulted. A further object of this invention is to provide optimum focus in both cases.

Additionally, because of clearance problems caused by flanges on the microfiche film card support carriage, it was impossible to use the peripheral area of the microfiche film card for imaging. A further object of this invention is to provide improved utilization of the peripheral portions of the film card area.

Finally, the developing station was integral with the film head and effectively precluded the inclusion of adequate backing elements for the film strip, and required the employment of a small inefficient transfer flash requiring an impracticably large power supply to achieve the requisite luminous output. A further object of the invention is to provide for arrangement of parts and stations to provide adequate room for more effective backing elements and a more efficient transfer flash system.

SUMMARY OF INVENTION

According to a feature of the invention a microfiche recording system using a traveling film head to transfer an intermediate image from an imaging station to a microfiche film card at a transfer station employs a folded optical system of downward facing mirrors to relay the image of hard copy upwards, then laterally by an offset, then back down to the imaging station. By using downward facing mirrors the dust problems encountered in the prior art system which relayed the image upwards after a similar offset to a film head whose travel axis was parallel to the axis of said offset are largely eliminated, resulting in reduced system maintenance costs.

According to a feature of the invention, by returning the image of the hard copy downward to a low-lying imaging station, a significant reduction in system height is achieved, and access for maintenance is markedly improved.

According to a feature of the invention the direction of film head travel from imaging station to transfer station is from front to rear, perpendicular to the axis of said lateral offset, resulting in a system slightly deeper from front to rear and significantly reduced in overall length, resulting in a more efficient utilization of system supporting space.

According to a feature of the invention the principal mechanical elements of the system are slidably mounted in a front-access drawer, resulting in significantly improved access for film loading and system maintenance.

According to a feature of the invention, a separate developing station allows more room for various system elements to be placed under the imaging area of the intermediate film strip carried by the film head. In particular, film support elements are provided to support the entire frame area of the intermediate film during initial imaging and transfer, resulting in rigid planar positioning of the intermediate film strip. Improved focussing and reduced sensitivity to system vibration are achieved thereby.

According to a feature of the invention swiveling film backing elements serve to align both intermediate and microfiche films into proper planar registry for imaging, resulting in improved image resolution.

According to a feature of the invention an interposable corrector lens at the imaging station corrects for different standoff distances of the image layers in the intermediate and microfiche films, and provides optimum focus during imaging and readback operations. Significant improvement in image quality is achieved thereby.

According to a feature of the invention the intermediate film is forced upward into contact with the microfiche film card at the transfer station, whereby substantially full utilization of the peripheral regions of the film card is achieved, resulting in a significant reduction of unavailable card area and a resulting cost economy.

According to a feature of the invention the intermediate film is bowed downward by the same amount at the imaging station, thereby suppressing registry error and at the same time allowing use of a single station lifting element for initial imaging and readback.

DESCRIPTION OF DRAWINGS

FIG. 5 is a partially sectioned side elevation of the system drawer assembly. Elements of the film head and film head carriage have been sectioned away to show interior details. The front part of the microfiche carriage assembly is shown in partial detail;

FIGS. 15A–15G are front elevations of the stations, showing details of engagement of the intermediate film and microfiche film at the various stations;

DESCRIPTION OF EXEMPLARY FORM OF THE INVENTION

Figure 1:
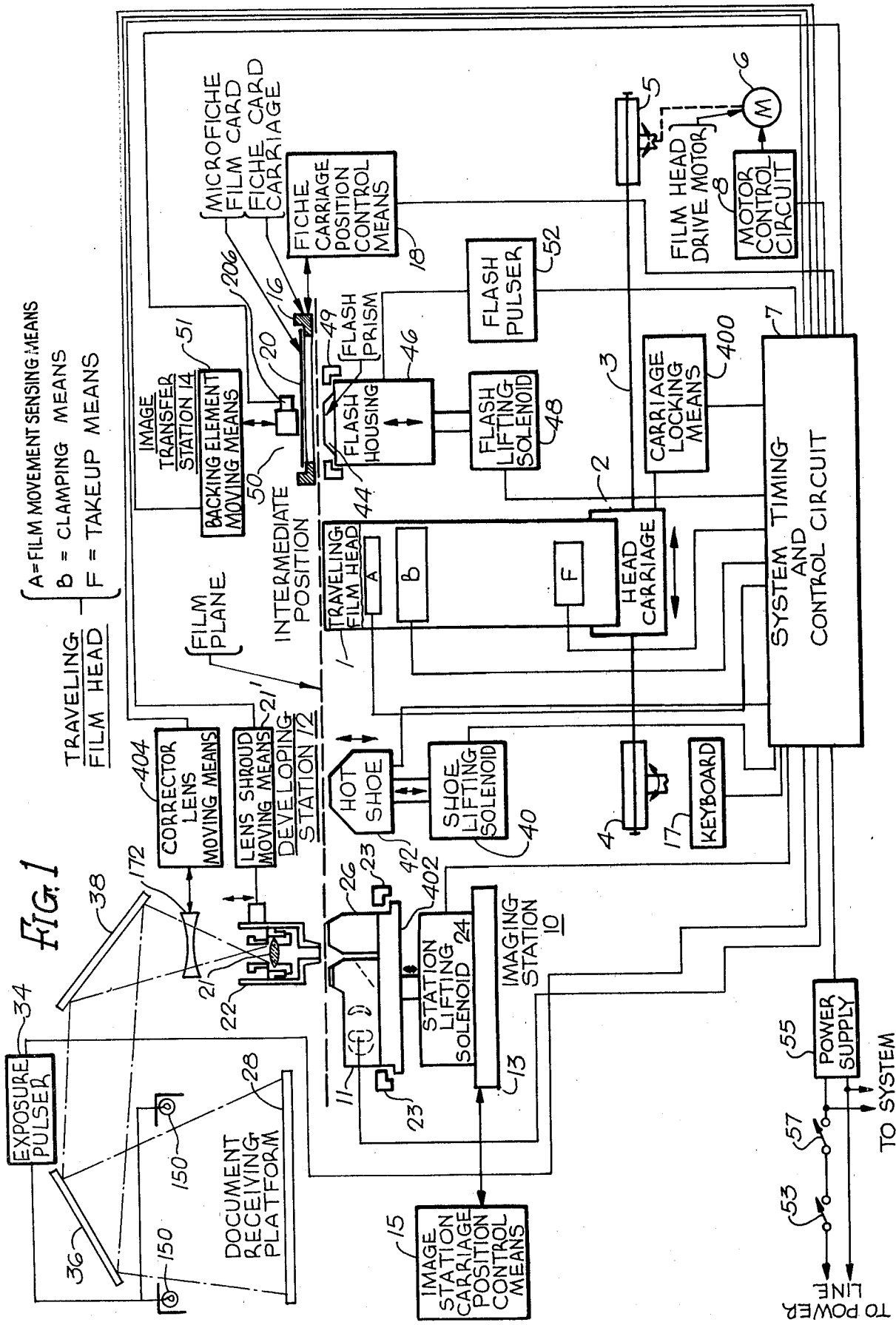
FIG. 1 is a block diagram of the control circuitry of the microfiche recording system.

Before describing the details of the cabinetry and unique physical relationships between various elements of the microfiche recording system of the invention, it would be helpful first to describe the basic elements involved and how they operate to produce a microfiche record from hard copy. Refer now to FIG. 1 which shows the major elements of the system, and a block diagram of the control system for sequencing the operation and movement thereof. These elements include an intermediate film strip carrying head 1 and carriage 2 which carries the head and moves the same between various stations to be described of the microfiche recording system. The head carriage 2 is advanced to the various stations illustrated in FIG. 1 by tension in a belt 3 extending between an idler pulley 4 and a motor driven pulley 5. A pulley drive motor 6 is controllably driven in both directions by a system timing and control circuit 7 operating through a motor control circuit 8. A carriage locking means 400 responsible to the system timing and control circuit 7 locks the head carriage 2 in position upon termination of the motor drive. The stations illustrated are an imaging station 10, where the exposed area of the initially transparent intermediate film strip 71 on the film head 1 is exposed to a light image, such as light reflected off of a hard copy placed on a platform 28, a heat-applying developing station 12 where the light-exposed areas of the intermediate film are rendered opaque, and an image transfer station 14. A microfiche film card carriage 16 at the image transfer station 14 positions, under control of a fiche carriage position control means 18, a selected frame of a microfiche film card 20 for reception of an image last formed on the film strip carried by the film head 1. The microfiche film card 20 is preferably made from a photodeveloping initially opaque archival film of the dispersal type disclosed in U.S. Pat. No. 4,137,078 issued to Izu and Ovshinsky, wherein a transferred image is formed automatically upon direct exposure to a high intensity flash of radiant energy, such film being completely insensitive to exposure to normal room ambient light or even direct sunlight. The intermediate film carried by the film head is preferably more light sensitive and is latently imaged by the relatively less intense fluorescent lamp light reflected and imaged from hard copy. The intermediate film carried by the film head is preferably a dry-silver heat-developed film.

The film head 1 includes a frame removably attached to the carriage 2, and a film supply unit removably mountable on the frame. The film head 1 carries a film movement sensing means A, film takeup means F, and a film clamping means B. In various embodiments of the invention all three are sequentially controlled by the system timing and control circuit 7.

Figure 16A:
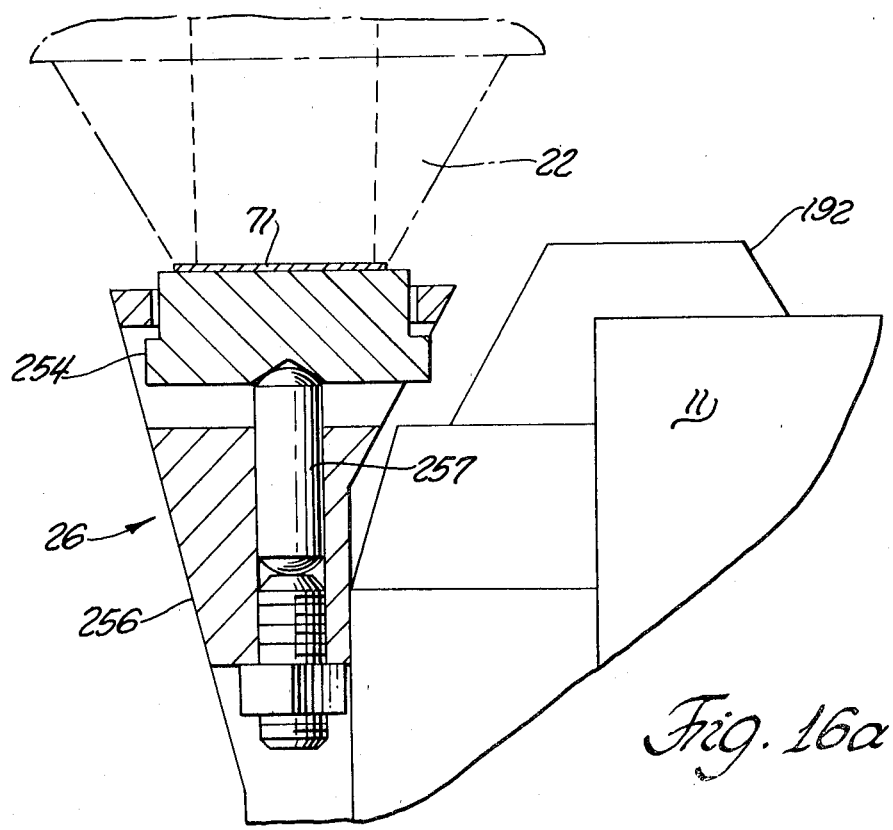
FIG. 16A is a sectional side elevation of the pressure pad assembly.
Figure 16:
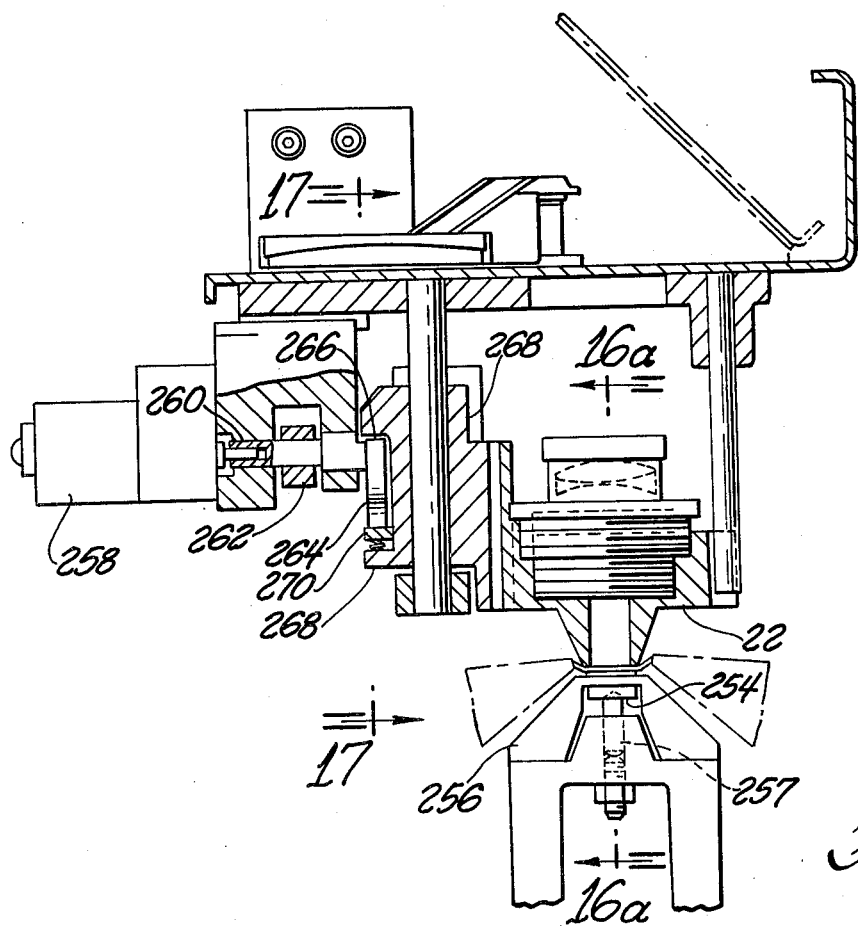
FIG. 16 is a partially sectioned front elevation of the lens shroud, lens shroud actuating system, and pressure pad assembly.

Initially, the film head 1 is moved to the imaging station 10, where an imaging area of the film strip is placed under a projection lens 21 contained in a lens shroud 22 (see also FIG. 16). The lens shroud has a rectangular base containing a rectangular aperture defining the maximum image size. An image station carriage position control means 15 positions a pressure pad 26 on a platform 402 under the lens shroud 22. The film clamping means B is actuated to a film release condition and an area of fresh intermediate film strip is advanced by driving the takeup means F. Payout length is governed by the film movement sensing means A, which effects generation of electrical signals measuring the length of the film payout to the system timing and control circuit 7. In the preferred embodiment, the film movement sensing means A effects generation of a series of pulses as the film advances, the number of which measures the payout length. After the requisite film advance, the system timing and control circuit 7 stops driving of the film takeup means and actuates the clamping means B back to a film holding condition, whereupon a signal from the system timing and control circuit 7 raises the platform 402 up against a limit stop 23 by actuating a station lifting solenoid 24. A subsequent command from the system timing and control circuit 7 actuates a lens shroud moving means 21' to lower the lens shroud 22 to clamp the intermediate film between the pressure pad 26 and the base of the lens shroud 22. A document receiving platform 28 is next illuminated by fluorescent flash lamps 150—150 energized by an exposure pulser 34 on command from the system timing and control circuit 7, the image of the platform 28 and its contents being relayed to the projection leans 21 by two uniquely arranged offset mirrors 36 and 38. (As will be later shown, these mirrors are horizontally spaced in a direction transverse to the direction in which the film head 2 is moved between stations 10, 12 and 14, although diagrammatic FIG. 1 does not show their relationship). On command, the station lifting solenoid 24 drops the platform 402 and hence the pressure pad 26, and the lens shroud moving means 21' lifts the lens shroud 22, thereby releasing the film. The film head 1 is now moved to a developing station 12, where a shoe lifting solenoid 40 controlled by the system timing and control circuit 7 raises a hot shoe 42 powered by the system timing and control circuit 7 against the imaging area of the film strip 71 for a predetermined length of time set by the system timing and control circuit 7, whereupon the shoe lifting solenoid 40 drops the hot shoe. The film head 1 is then moved to a position which places the imaging area 9 of the film strip over a flash prism 44 on a flash housing 46. A selected frame of a microfiche film card 20 on a microfiche card carriage 16 is moved into appropriate position over the flash housing 46 with the system timing and control circuit 7 controlling the microfiche carriage position control means 18. The desired frame of the microfiche film card 20 is selected by operation of keys of a keyboard 17, which causes the control circuit 7 to operate the microfiche carriage position control means 18. On command of the system timing and control circuit 7, a flash lighting solenoid 48 raises the flash housing 46 against a limit stop 49. A backing element 50 above the microfiche film card is lowered by the backing element moving means 51 so as to press the selected frame of the card and the intermediate film strip into intimate contact with each other and the solid upper surface of the light prism carried by the flash housing 96. Image transfer is achieved by actuating the flash tube (not shown) in the flash housing 46 by a command from the system timing and control circuit 7 operating through a flash pulser circuit 52. Immediately after exposure, the lifting solenoid 48 drops the flash housing 46, and the backing element moving means 51 raises the backing element 50, thereby releasing the two films. The backing element 50 has an attached photosensor system 206 used to determine the prior exposure history of a given microfiche frame.

For reading or updating a microfiche the fiche card carriage 16 is moved by the fiche carriage position control means 18 to a position under the lens 21, and a projection illuminator 11 is moved into position below it by the image station carriage position control means 15 and the station lifting solenoid 24 so as to project the image on the microfiche back onto the document receiving platform 28 for inspection and, where an add-on of information is to be made on the frame of the microfiche card involed, an overlay of the added information can be properly positioned over the projected image. The recording system carries out the desired "read," "record" and microfiche frame positioning operations as commanded by the operator by depressing the appropriate keys on a keyboard 17 connected to the system timing and control circuit 7. The intermediate film 71 and microfiche film card 20 are thus rigidly held in position during both image-forming processes, thereby holding vibration effects to a minimum. This accomplishes one of the objects of the invention.

A corrector lens 172, removed from the optical path during the recording of the hard copy image and intermediate film 71, as selectably interposed by a corrector lens moving means 404 into the image field to correct for defocusing effects arising from the fact that the image formed on the microfiche film card 20 is in a different plane from the image formed and focused on the intermediate film 71 by the lens 21.

Figure 2:
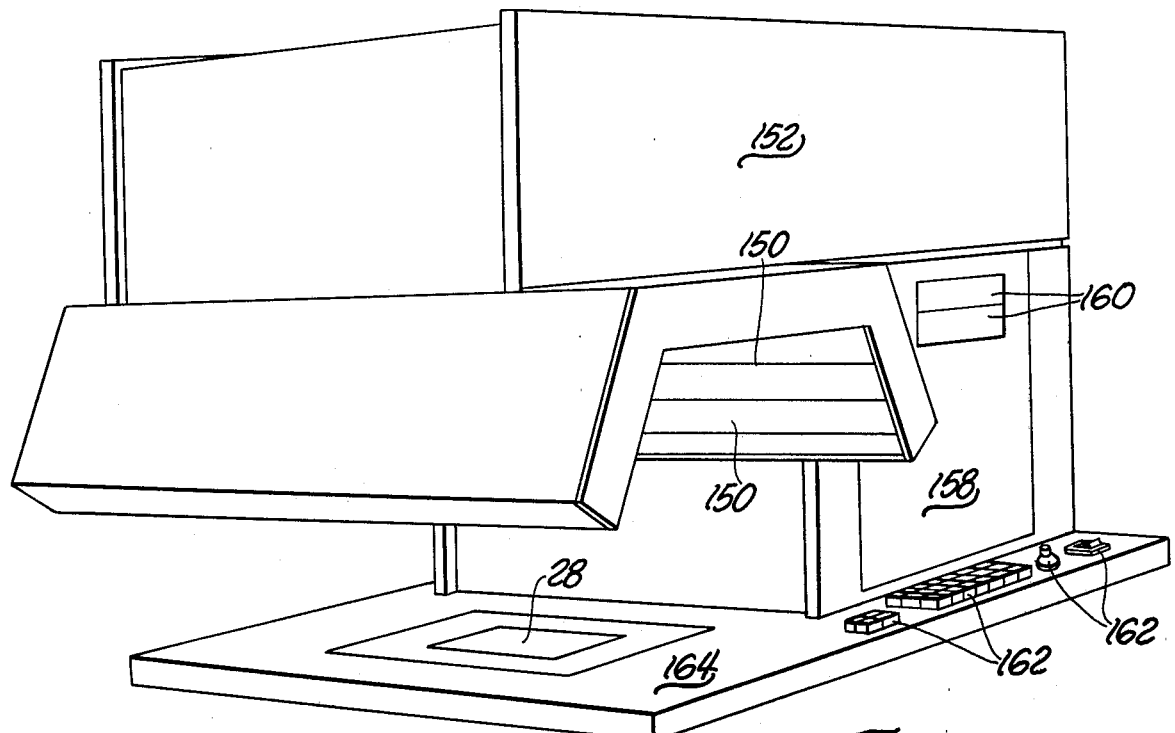
FIG. 2 is a perspective view of the cabinetry of the improved recording system.

The system timing and control circuit is powered by a power supply 55 connected to the power line by a main power switch 53 and a system interlock switch 57 actuated to an open position by opening a system access door (FIG. 2). In the exemplary form, all sequencing and sensing operations are carried out by a program stored in a minicomputer memory, the minicomputer constituting a portion of the system command and control circuit 7.

Figure 8:
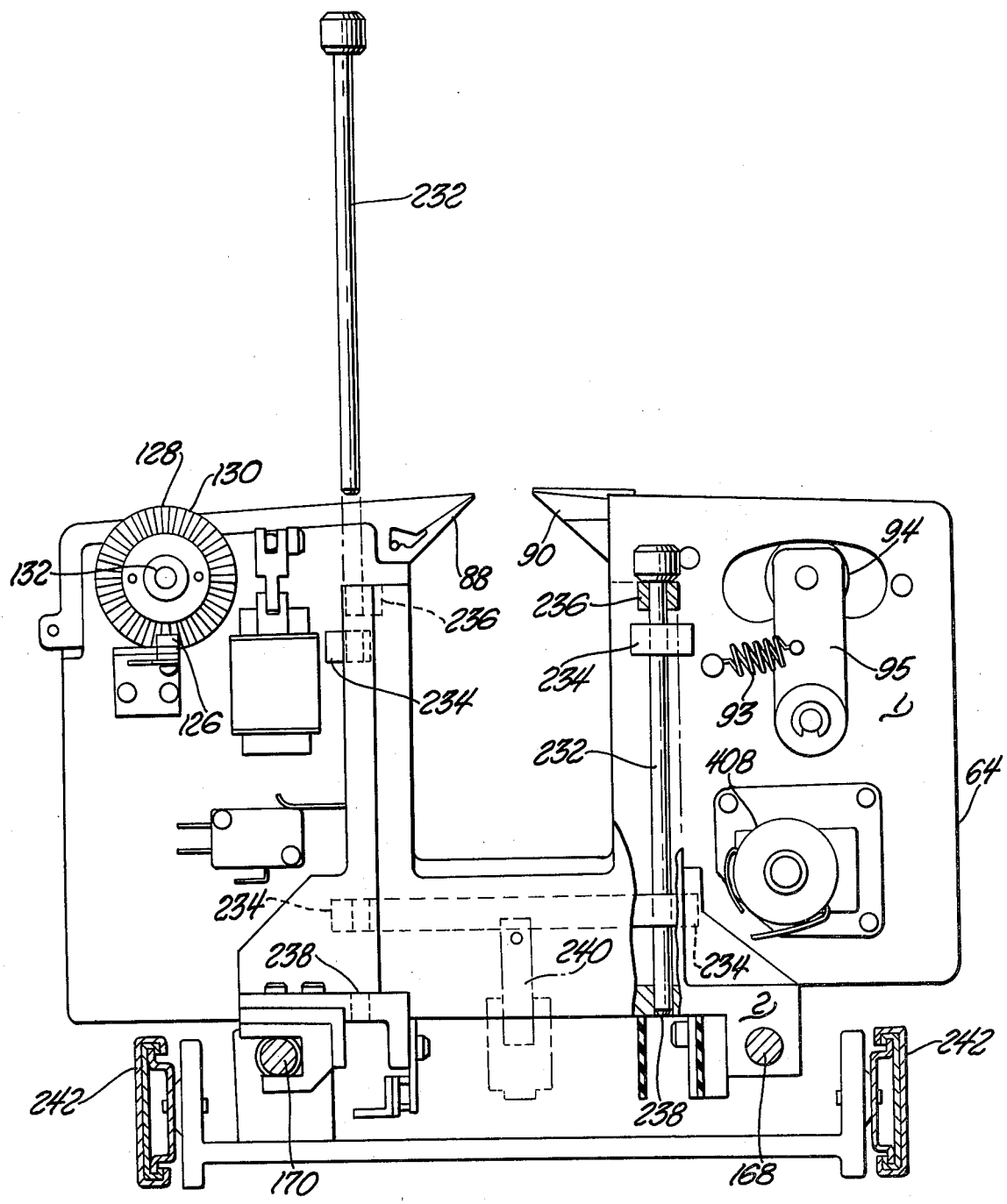
FIG. 8 is a rear elevation of the film head mounted on the film head carriage, and shows details of the slideable engagement of the film head carriage with the support rods. Details of locking pin engagement are shown.

FIG. 5 is a front elevation of a preferred form of film head 1 developed by H. Ovshinsky and P. Klose and described in detail in a co-pending application entitled "Microfiche Recording System With Traveling Film Head," Ser. No. 227,957 filed Jan. 23, 1981. FIG. 8 is a rear elevation of the film head 1 mounted on the head carriage 2. A supply of intermediate film 71 loaded on a supply reel 63 within a casette 62 mounted on a film head frame 64 passes around an idler roller 76 and an encoder roller 82, then between a clamping block 86 and a clamping blade 85 attached to a pivoted cover 89. Actuation of a cover lifting means 406 alternatively releases the film 71 or clamps it against payout. The film 71 then exits the film supply section over a payout lip 88 where one frame width of the film strip is exposed for external processing at which may be called an imaging area of the film head. The frame 64 has a large open region 91 between the film supply section and the film takeup section of the film head. This open region receives the backing pad 26, hot shoe 42 and flash housing 46 at the imaging, developing and image transfer stations 10, 12 and 14. The film then passes over a takeup lip 90 on the takeup side of the imaging area and then proceeds over a dancing roller 94 carried on an arm 95 tensioned by a spring 93 which forces the roller away from the takeup lip 90, and serves to keep the film under tension. The film then winds on a motor driven takeup reel 98 driven by a locking takeup motor 408 mounted on the frame 64. The intermediate film strip 71 is thus held clamped against further payout by the blade 85, and is compliantly tensioned by the tensioned dancing roller 94. The film strip 71 is free to move responsively to stresses induced by the various elements contacting it at the imaging, development, and transfer stations. As is pointed out in said co-pending application by H. Ovshinsky and P Klose, the resulting lateral film shift will result in registry error during annotation unless the dimensions and travel of these elements are carefully controlled. The film strip may be controllably bowed either up or down at the imaging and transfer stations provided these precautions are observed. As will be shown subsequently in this disclosure, by bowing the film strip 71 down at the imaging station, a single lifting actuator (the station lifting solenoid 24 of FIG. 1) can be used to raise both the pressure pad 26 and the projection illuminator 11. By bowing the film 71 upward at the transfer station, more efficient utilization of microfiche card area is achieved.

Actuation of the film advance motor 408 causes the intermediate film to advance under tension over the encoder roller 82, causing the encoder roller to rotate.

The rotation of the encoder roller 82 is detected by a light sensing unit 126 mounted on the frame 64, which monitors the passage of opaque interruptor lines 128 on a transparent encoder wheel 130 attached to the outboard end of the encoder roller shaft 132, the wheel, shaft, and roller being rigidly interconnected. The series of light pulses detected by the light sensing unit is transmitted to the system timing and control circuit 7 as the intermediate film pays out over the encoder roller 82 during film advance. The pulses are counted by the system timing and control circuit 7. When the count reaches a predetermined value, the system timing and control circuit 7 terminates power to the film advance motor 408, which drives the takeup reel 98.

Figure 2A:
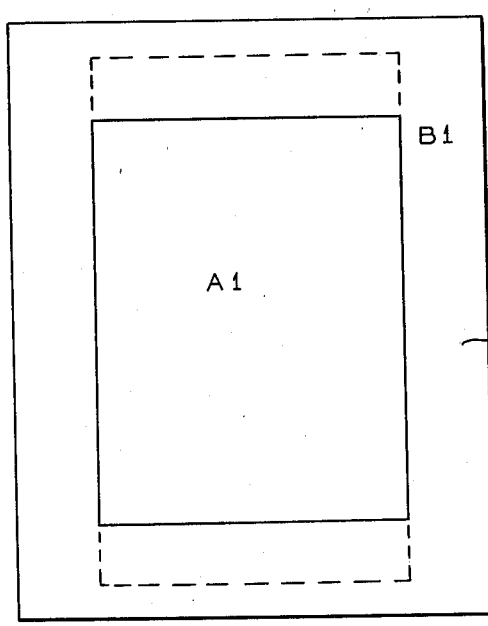
FIG. 2A is a top plan view of one side of the reversible document platform.
Figure 2B:
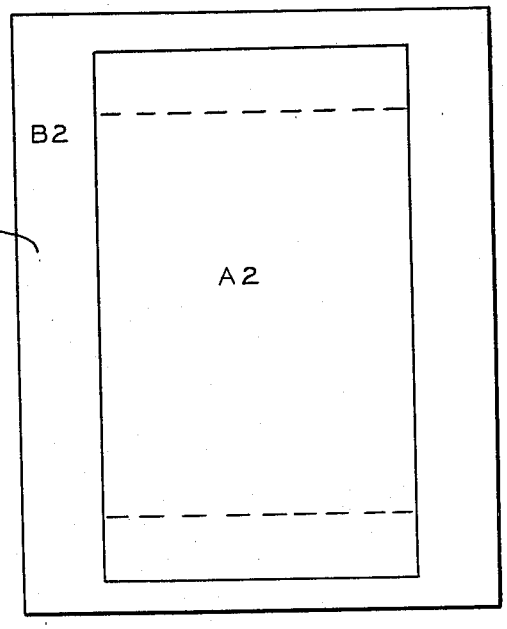
FIG. 2B is a bottom plan view of the same platform.

FIG. 2 shows a perspective view of the cabinetry of the improved recording system. A series of illumination sources 150—150, preferably fluorescent lamps of conventional type, illuminate a plate shaped document receiving platform 28 on the system table 164, the image being relayed through said mirrors 36 and 38 (FIG. 1) inside a removable top cover 152 to the film head system inside the system housing 156. Access to the system housing is obtained via a system access drawer 158. A light tight mechanically actuated loading gate consisting of two shutter leaves 160 allows loading of the microfiche film card into the system. A group of command keys 162—162 comprising the keyboard 17 of FIG. 1 are immediately accessible to the operator. The document platform 28 shown in FIGS. 2A and 2B is reversible and sits in a platform well 166 in the document table. The borders B1 and B2 of the two sides of the reversible document platform 28 are blackened and facilitate centering of ordinary and legal sized documents of standarized format under the optical system in white opaque center area A1 and A2, respectively.

Figure 3:
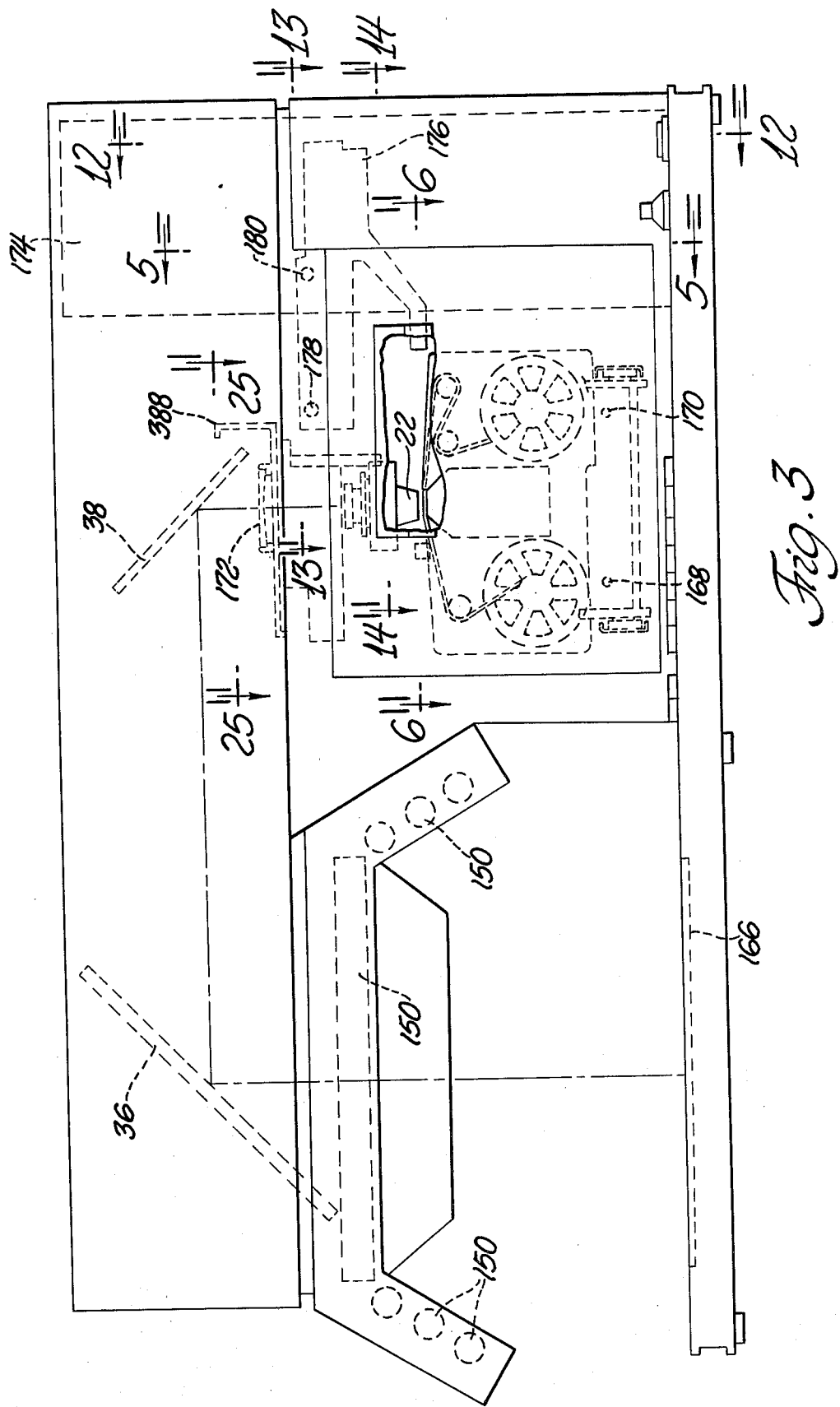
FIG. 3 is a front elevation of the cabinetry with the loading gate region partially sectioned away, showing relative placement of the optical train, film head, and microfiche carriage support system.
Figure 4:
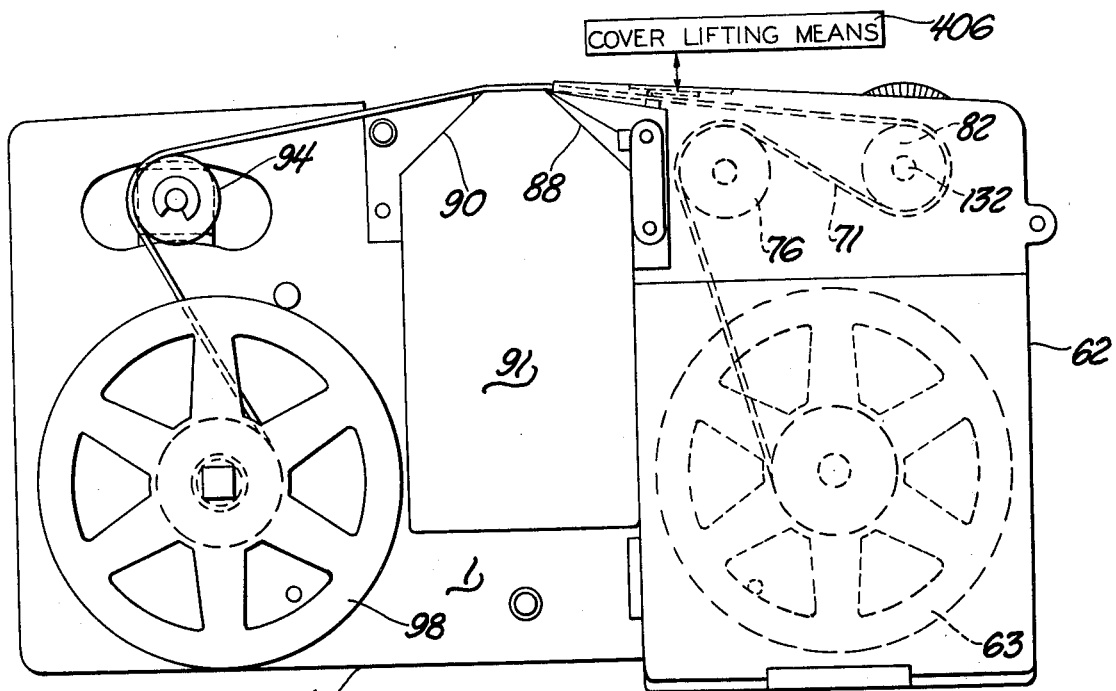
FIG. 4 is a front elevation of a preferred form of film head, showing film clamping and tensioning means.
Figure 13:
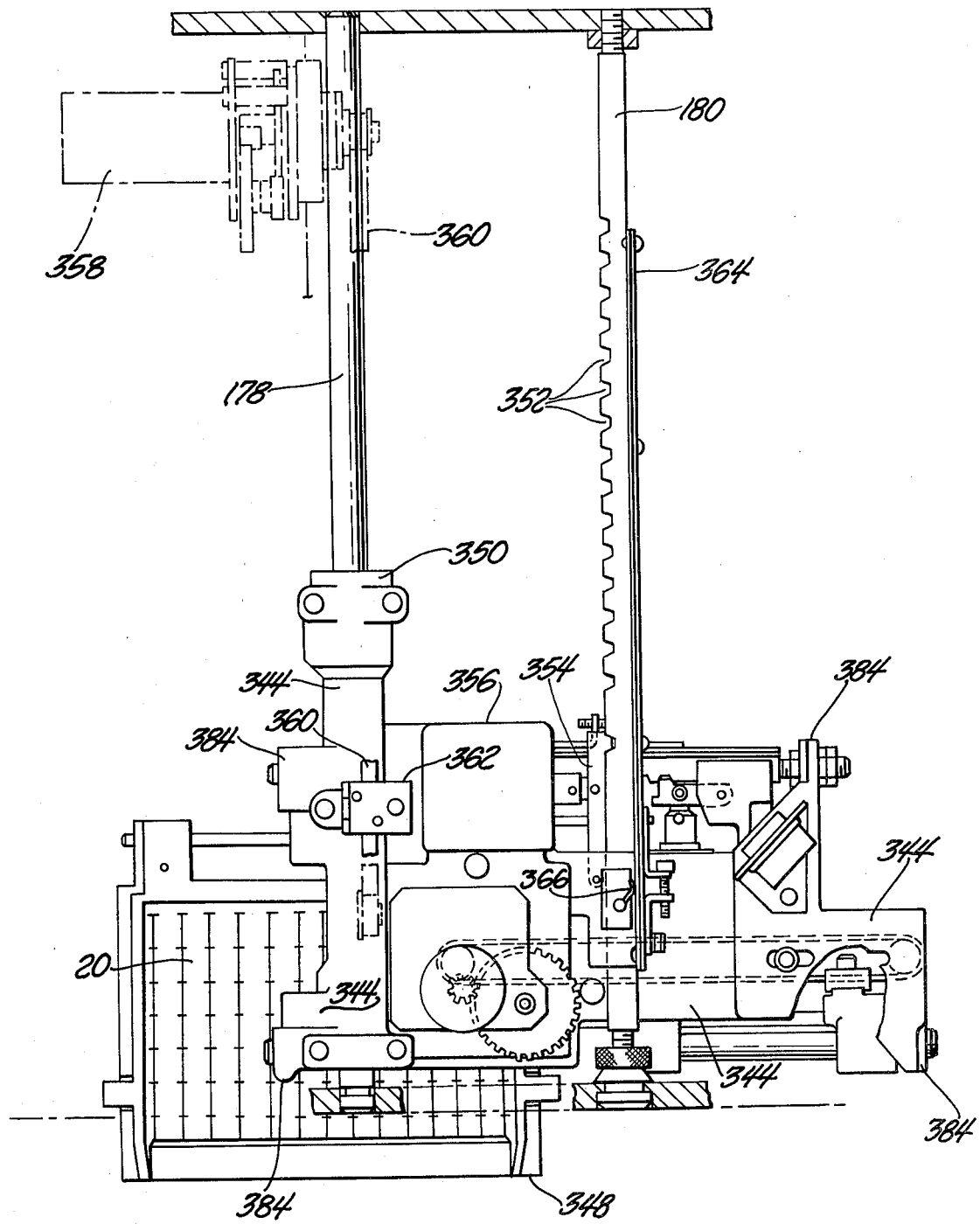
FIG. 13 is a top plan view of the microfiche film carriage assembly.
Figure 14:
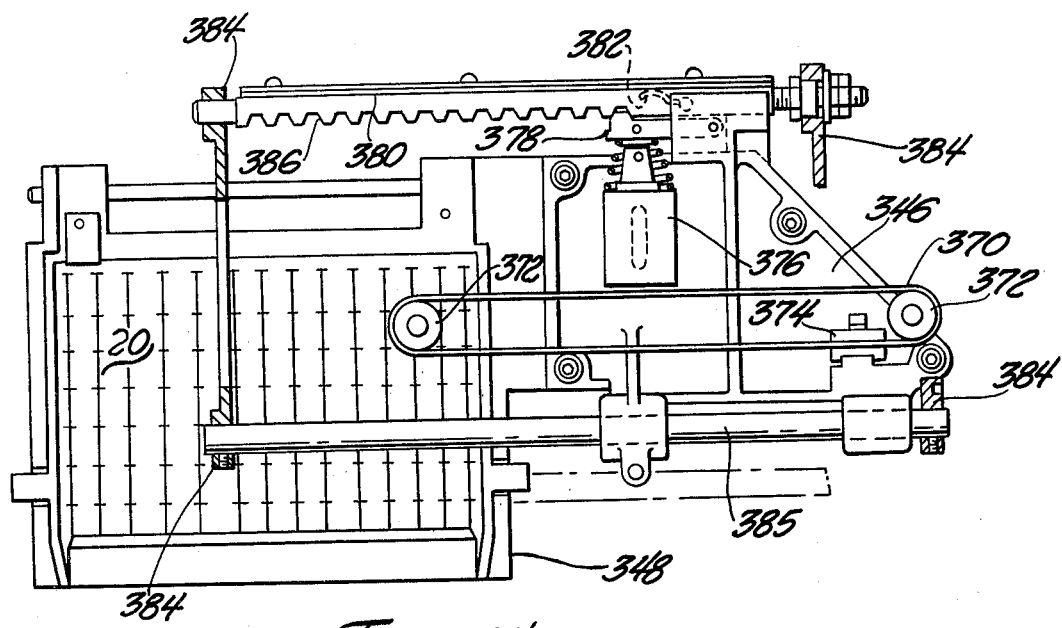
FIG. 14 is a partially sectioned top plan view of the lower microfiche carriage assembly.

FIG. 3 is a front elevation of the cabinetry with the loading gate region partially sectioned away to show relative placement of the film head 1 and the microfiche film card carriage assembly 16 (see also FIGS. 13 and 14). Elements between the film head 1 and the front of the cabinet have been deleted for clarity. In dash lines are shown of the optical train consisting of a primary mirror 36 and a secondary mirror 38 whereby the image of a document placed on the document platform 28 is directed first upwardly into the downwardly facing inclined mirror 36 which relays the image horizontally to downwardly inclined mirror 38 which directs the image down through the imaging lens 21 and imaging lens shroud 22 to a region of intermediate film 71 dispensed by the film head 1 mounted on film head carriage 2 shown in the phanton outline. The film head carriage 2 is slideably mounted on two front to rear support rails 168 and 170 mounted to the frame of the system access drawer 158. The electrically actuated interposable corrector lens 172 is mounted to be selectively moved into the optical path for purposes to be fully discussed subsequently. The electronics area 174, wherein substantially all command and control electronic circuitry and power supplies comprising the system timing and control circuit 7 are stored, is shown in phantom outline. FIG. 3 shows the location of the microfiche film card carriage assembly 176 suspended from two front to rear suspension rods 178 and 180.

By the arrangement described, the mirrors 36 and 38 are facing downward, and hence not subject to the dust problems encountered in the earlier version of the system previously preferred to. This accomplishes one of the objects of the invention. By moving the film head 1 from front to rear and by the mirror arrangement which directs the image to a low lying point, the overall height of the system is significantly reduced, as is the overall width of the system as seen in FIG. 3. Additionally, by placing the film head 1 on a system of rails carried by the slideable access drawer 158, system access for maintenance and replacement of film is greatly facilitated. This accomplishes two more objects of the invention.

Figure 6:
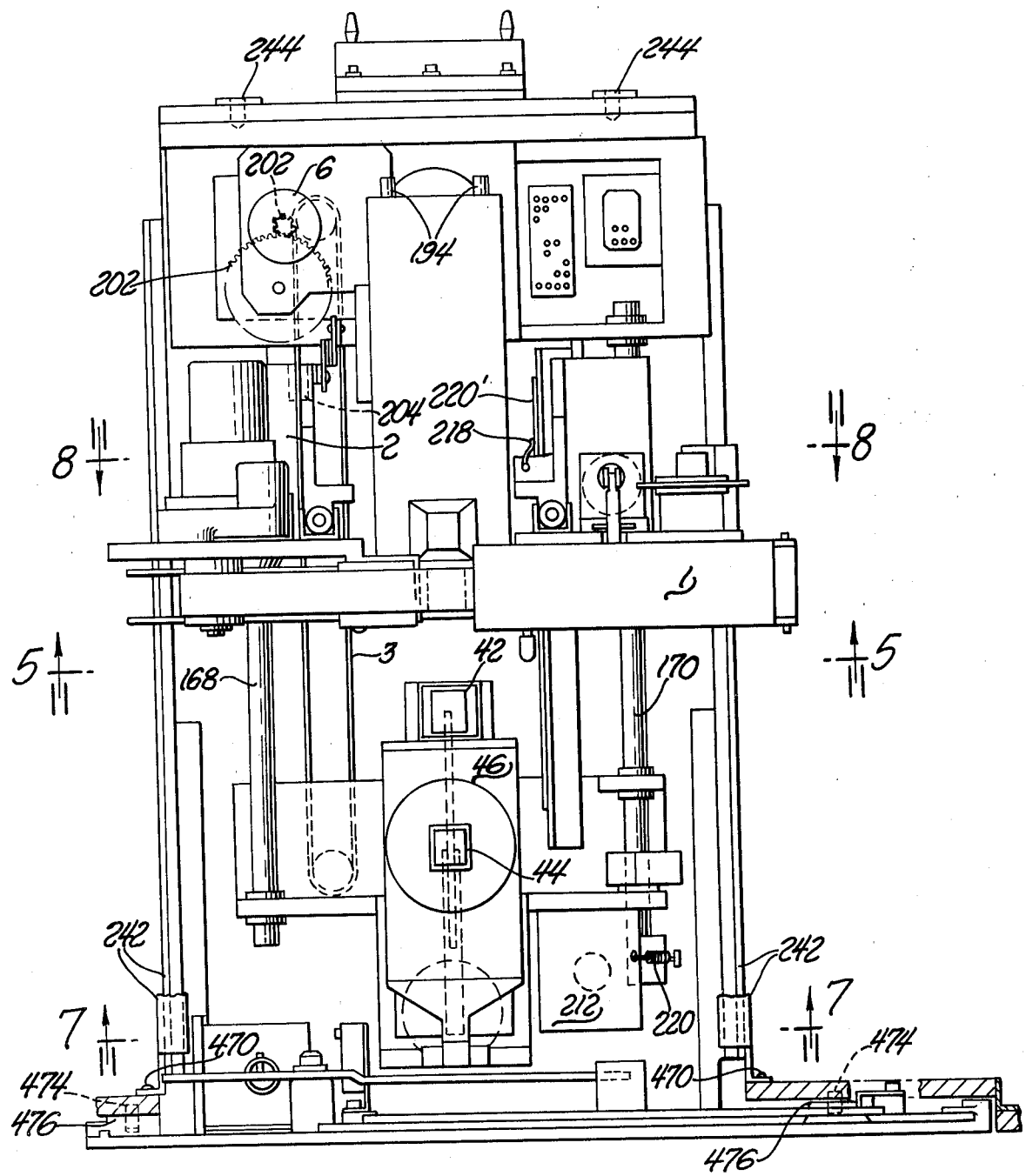
FIG. 6 is a top plan view of the system drawer assembly showing the film head positioned at the imaging station.
Figure 7:
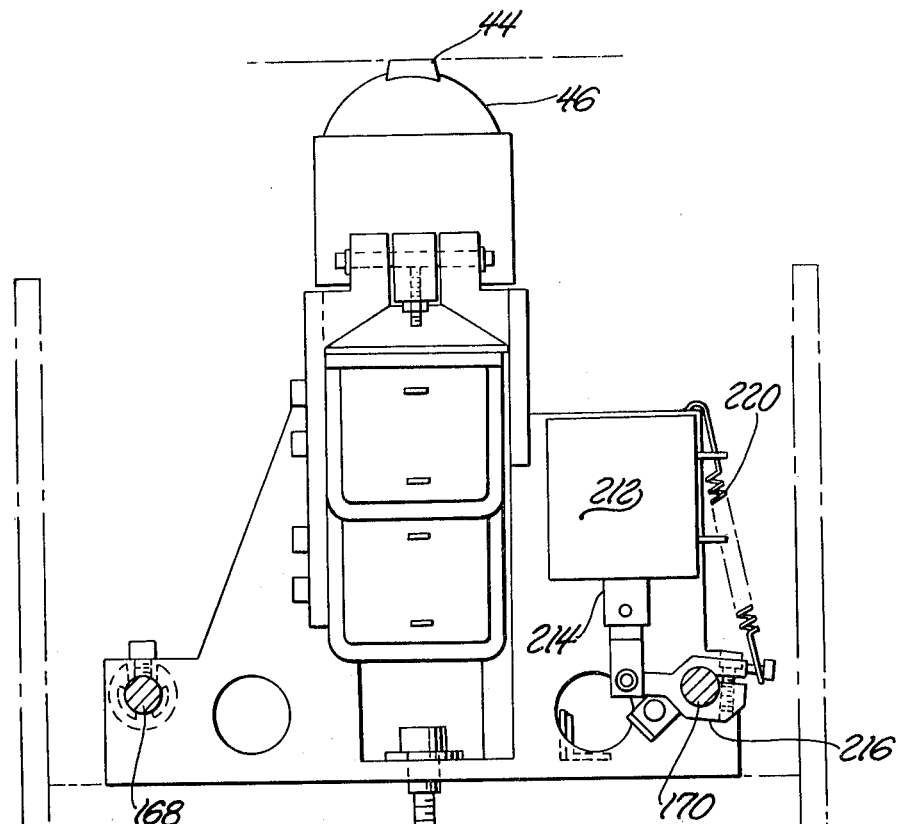
FIG. 7 is a front elevation of the flash housing showing rotary actuation of the carriage support rail for purposes of film head indexing.
Figure 9:
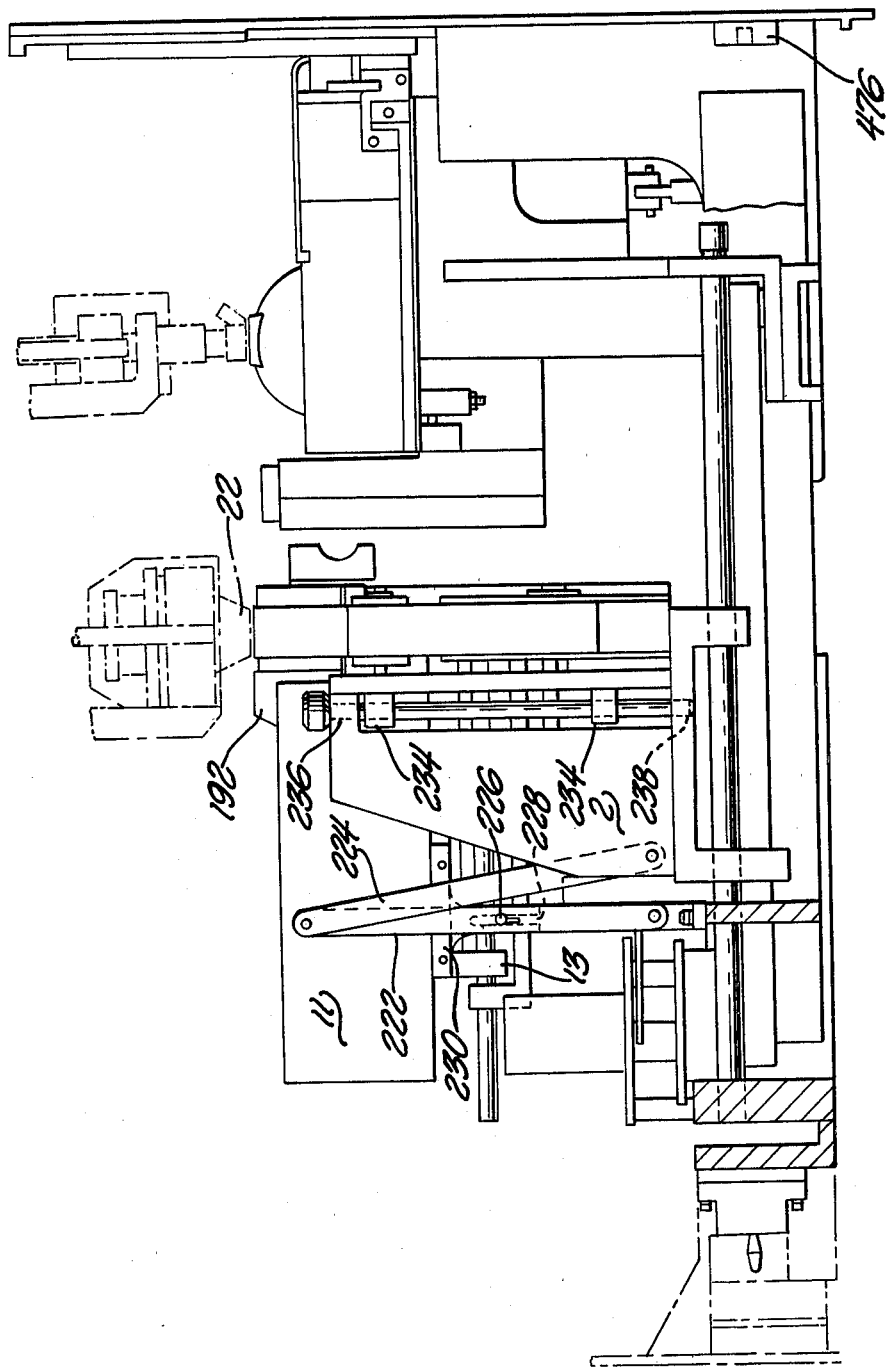
FIG. 9 is a side elevation of the system drawer showing the illumination station actuating scissors in the retracted position.

FIG. 5 shows a side elevation of the system drawer 158, and FIG. 6 shows the corresponding top plan view thereof. In FIG. 7, the film head 1 and film head carriage 2 are partially cut away, with the remainder of the film head shown in phantom outline. The microfiche film plane line 182 denotes the plane of motion of the lower surface of the microfiche film card 20 carried by the fiche card carriage 16, shown in fragmentary form. The film head carriage 2 is slideably mounted on two film head support rails 168 and 170. The film head 1 is shown positioned under the lens shroud 22. The pressure pad 26 shown schematically in FIG. 1 is unitary with the projection illuminator 11. The projection illuminator 11 comprises a conventional incandescent light source 184, condensing lens 186, light gathering mirror 188, planar mirror 190, output prism 192, and housing 410. The projection illuminator 11 is rigidly affixed to an image station carriage 13, the carriage in turn being slideably movable along two carriage support rods 194—194, the rods in turn being rigidly attached to a carriage support 196. The pressure pad 26 or the output prism 192 may be selectively positioned under the lens shroud 22 by moving the illumination station carriage 13 along the support rods 194—194 from front to rear. The head 1 is urged along the film head carriage support rails 194—194 to the various stations by a drive motor 6 (FIG. 6) actuated by the system timing and control circuit 7 (FIG. 1). The drive motor drives a pulley belt 3 through a series of reduction gears 202—202 (partially shown), the belt being rigidly tied by a clamp 204 to a portion of the film head carriage 2. In FIGS. 5 and 6 the film head 1 is in position at the imaging station for formation of the intermediate image on the intermediate film 71. Actuation of the drive motor 3 by the system timing and control circuit 7 moves the film head carriage 2 forward to position the film over the hot shoe 42 for development. After development, the drive motor 6 moves the film head to its extreme forward position, placing the film head over the flash prism 44 and under the microfiche film card 20 (not shown in FIG. 5) for image transfer. The backing element 50 at the transfer station includes an exposure photosensor 206 which is the subject of co-pending application of Herbert Ovshinsky, entitled "Double Exposure Control for Microfiche Recording System," Ser. No. 227,941, filed Jan. 23, 1981. Accurate head indexing is accomplished by a series of indexing pins and indexing detents. The film head carriage support rod 170 carries two indexing pins 208—208 (FIG. 5). The rod 170 is rotatable about its axis by means of a solenoid actuator 212 shown in FIG. 7, a front elevation of the flash housing. Actuation of the solenoid 212 by the system timing and control circuit 7 (FIG. 1) causes the solenoid armature 214 to be drawn upward, thereby driving a yoke 216 clamped to the rod 170 to rotate the rod clockwise as seen in FIG. 9, and thus rotating the pins 208 and 208 (FIG. 5) outward and away from the detects 210-210-70 in the base of the film head carriage 2. The carriage 2 is thus free to move under actuation of the carriage drive motor 6.

FIG. 8 is a rear elevation of the film head 1 mounted on the film head carriage 2, and shows details of the slideable engagement of the film head carriage 2 with the two support rods 168 and 170. With the carriage 2 so released, the system timing and control circuit 7 then actuates the drive motor 6 to drive the head 1 according to a pre-determined velocity-distance profile stored in the memory of a minicomputer (not shown) in the system timing and control circuit 7 (FIG. 1). Position sensing of the film head carriage 2 is achieved throughout this movement by a resistance slide wire system. A sliding electrical contact 218 moveable with the film head carriage 2 contacts a stationary resistance strip 220'. Electrical connections (not shown) from the system timing and control circuit 7 to the resistance element 220' and the slider 218 give instantaneous position sensings to the minicomputer in the system timing and control circuit, whereby the electric power supplied to the drive motor 6 is regulated to cause the carriage to follow said stored optimum profile. Instantaneous carriage velocity information is provided to the minicomputer via a tachometer which is integral with the drive motor 6. The tachometer is preferably a small DC generator having an output to the minicomputer varying in magnitude and phase according to instantaneous film head velocity and direction. All command sequencing and automatic control operations of the system are governed by a stored program in the minicomputer. An improved analogue-to-digital converter is employed for converting slidewire sensings to digital form, and is the subject of a co-pending application by Gary Lewis, entitled "Analogue to Digital Conversion System." Upon arrival of the film head 1 at the programmed station, the solenoid 212 is deactivated, whereupon a return spring 220 (FIG. 7) rotates the rotatable carriage support rod 170 to move the appropriate pin 208—208 (FIG. 5) into engagement with the appropriate detent 210—210—210, thereby locking the film head 1 in precise registry for the operation to be performed at the chosen station.

Figure 10:
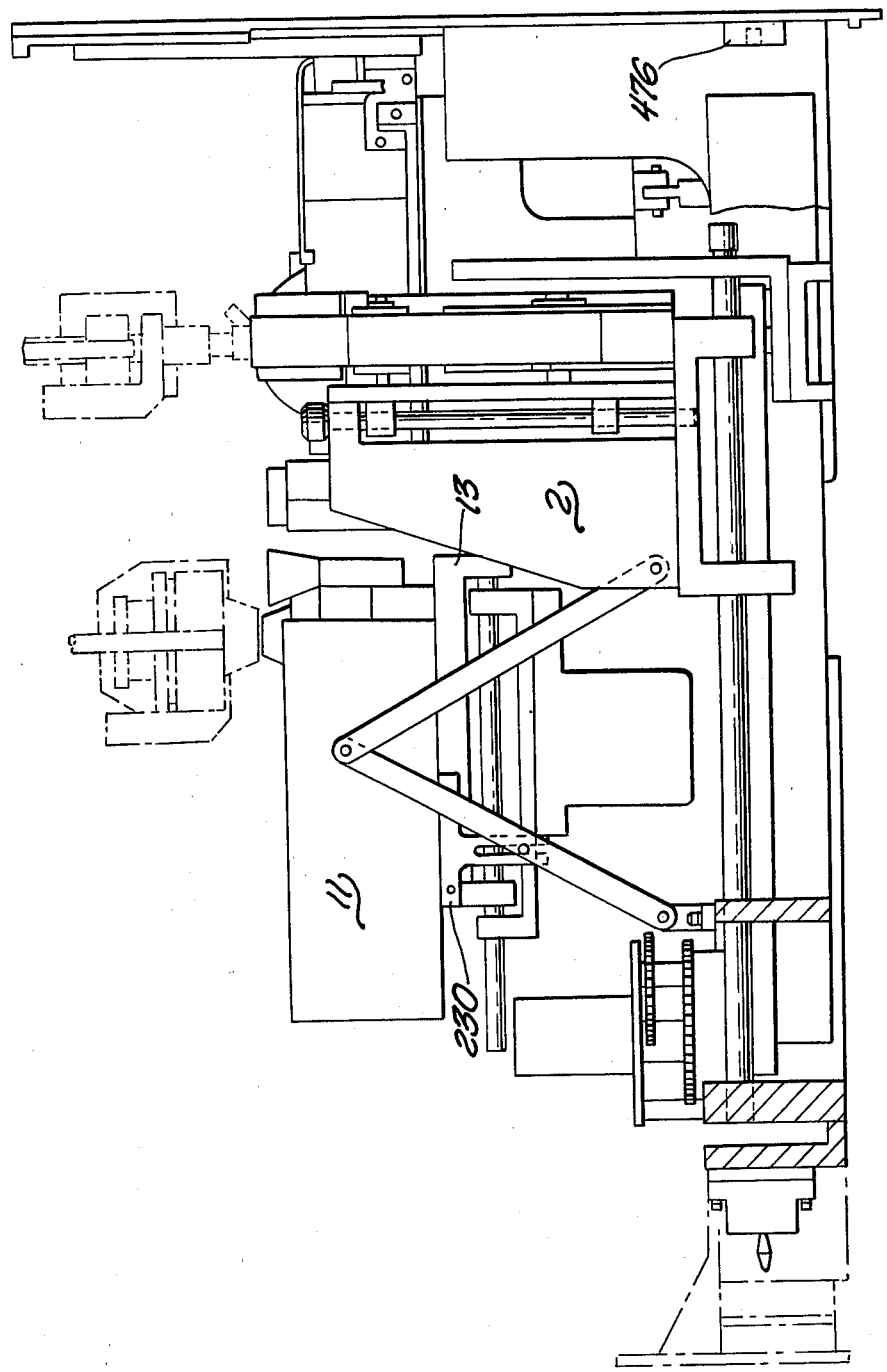
FIG. 10 is a side elevation of the system drawer assembly showing the extended position of the scissors placing the film head at the transfer station.

FIGS. 9 and 10 are side elevations of the drawer assembly showing a scissors actuation system for moving the illuminator prism 192 into position under the lens shroud 22 for projection of the image on the microfiche film card (not shown). When the film head 1 is driven forward to the transfer station as shown in FIG. 10, a scissors actuator consisting of two legs 222 and 224 drives the image station carriage 13 forward to place the illuminator prism 192 under the lens shroud 22. Extension of the scissors causes a captive pin 226 in the rear scissors element 222 and engaging a slot 228 in a pin guide 230 attached to the image station carriage 13 to move the image station carriage forward. By this technique, use of an additional electrical actuator to position the projection illuminator 11 for the "read" operation is eliminated. An alternative solution developed solely by Herbert Ovshinsky is to employ an independent projection illuminator actuator of conventional design responsive to the system timing and control circuit 7, whereby the projection illuminator 11 may be moved into position under the lens shroud 22 and the film head 1 may also be moved under the lens shroud at the same time, whereby the intermediate image on the intermediate film strip may be examined by the operator before the transfer operation. Such a modification, however, would require a reduction in the size of the illuminator housing 410 to allow passage of the film head 1 to place the imaging area of the intermediate film 71 over the output prism 192, or alternatively a change in the clearance silhouette of the film head.

FIG. 8, the rear elevation of the film head 1 and film head carriage 2, shows the moveable locking pins 232—232 whereby the film head is removably secured to the film head carriage 2. The figure is partially sectioned to show details of the pin engagement.

FIG. 9 shows additional details of the engagement. Each pin engages two bosses 234—234 on the film head 1 and two bosses on the film head carriage 2 and pin wells 238 in the base of the film head carriage 2. A spring loaded latch 240 secures the assembly together.

Figure 11:
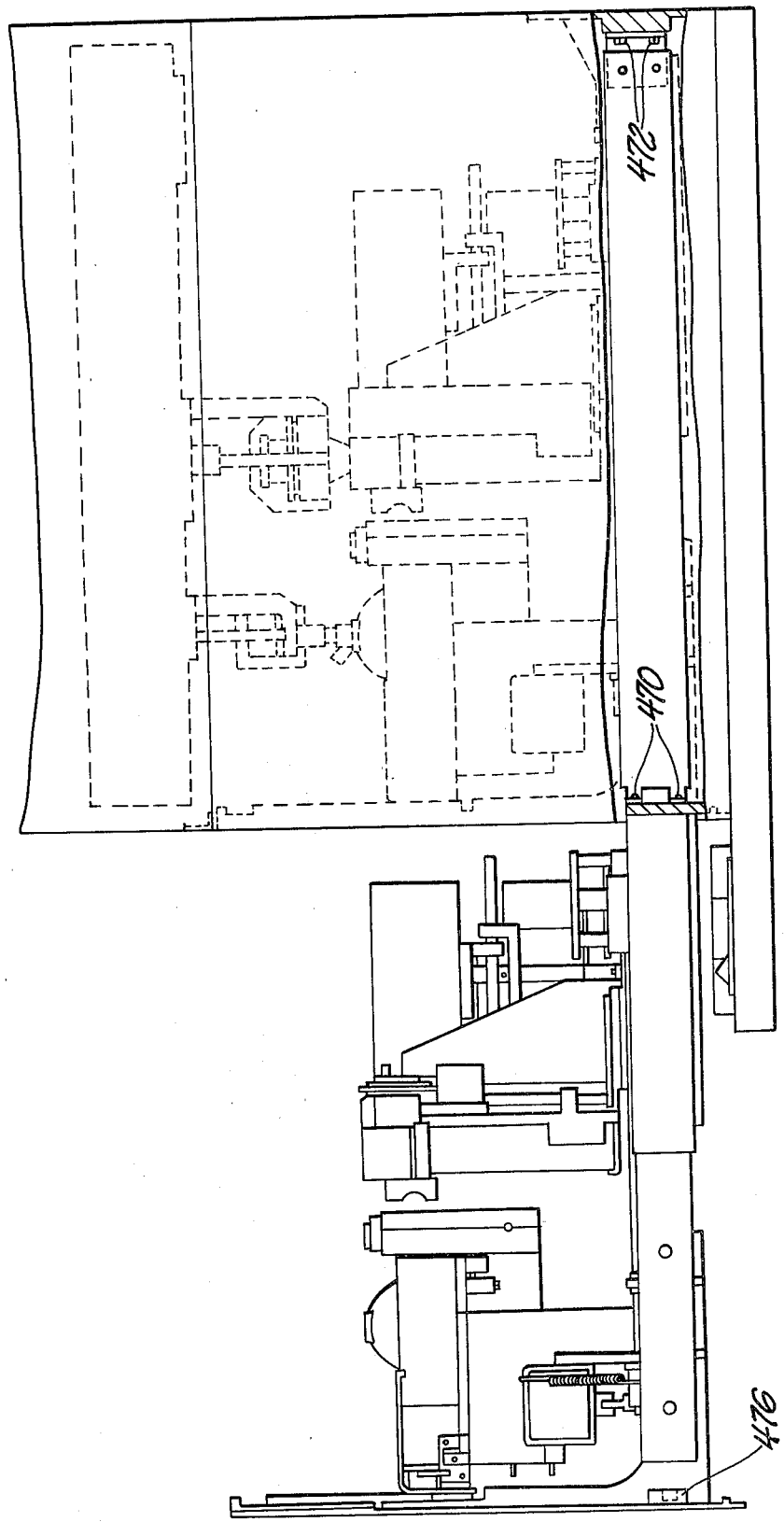
FIG. 11 is a side elevation of the system housing showing details of the drawer extension.

FIG. 11 shows the drawer 158 extended for access to the system. The drawer assembly is supported on telescoping rails 242—242 shown in cross-section in FIG. 8, the rails being rigidly supported to the base of the system housing by front support screws 470—470 and rear support screws 472—472 (FIG. 11). Two rear centering pins (not shown) engage two rear carriage bosses 244—244 (FIG. 6), and two front centering pins 474—474 (FIGS. 5 and 6) engage two front carriage bosses 476 (FIGS. 6 and 11) to provide accurate centering of the drawer assembly when the drawer is closed. A spring-loaded latch (not shown) holds the drawer closed under stress against the centering pins during machine operation.

Figure 23:
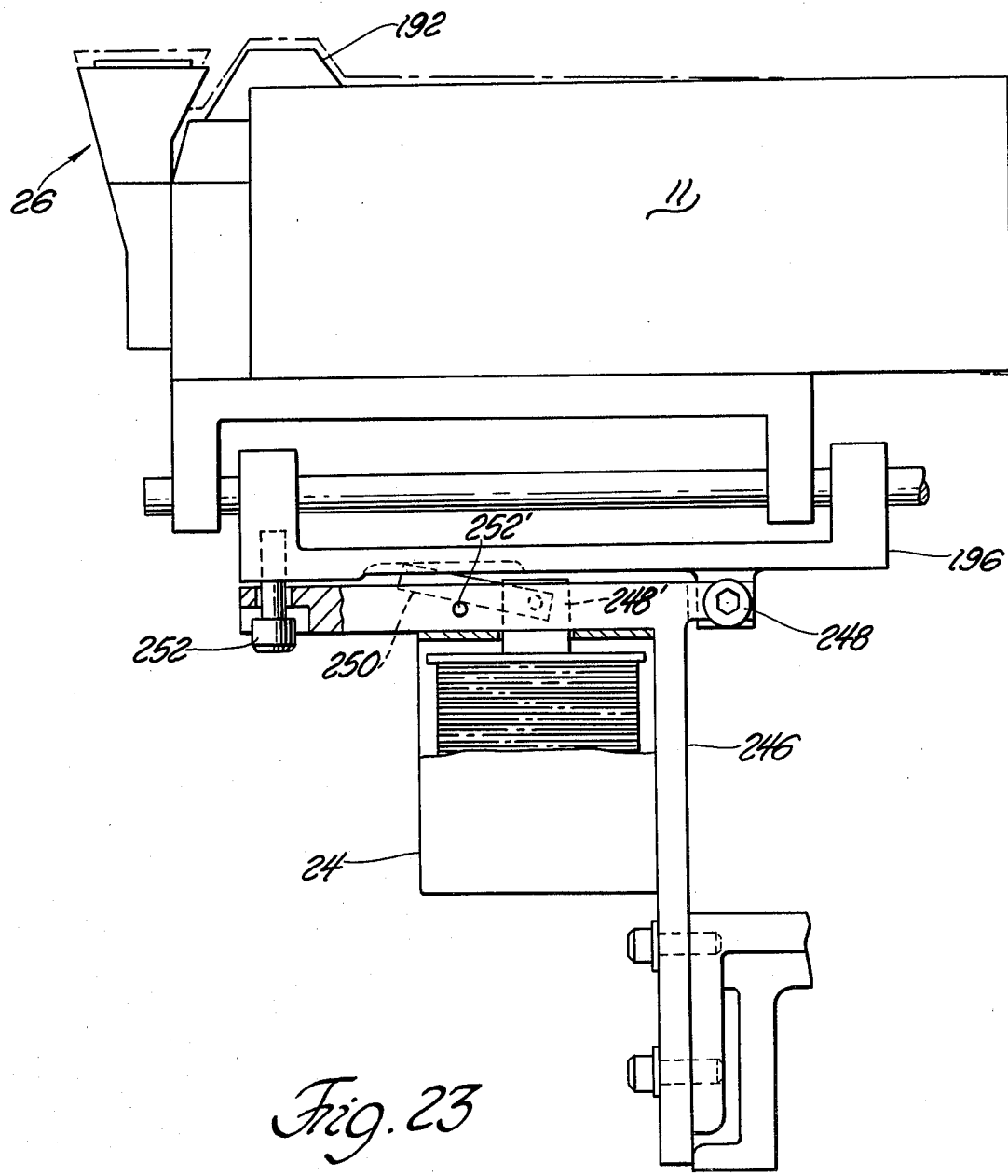
FIG. 23 is a side view of the projection illuminator and pressure pad assembly showing details of the station lifting means.

FIGS. 5 and 23 show details of the lifting means for moving the pressure pad 26 or illuminator prism 192 into position under the lens shroud 22. The image station carriage support 196 is attached to the image station frame 246 by a pivot 248. Actuation of the image station lifting solenoid 24 by the system timing and control circuit 7 draws the solenoid armature 240' downward causing a lift bar 250 to rotate about a pivot 252' and engage the base of the carriage support 196, thereby causing rotation of the image station carriage support about the pivot 248. A set screw 252 limits the travel of the carriage support 196 as shown.

FIGS. 16 and 16A show details of the imaging station backing pad 26 of FIG. 1. A wobble plate 254 is held loosely captive in a backing pad frame 256 attached to the projection illuminator 11. The wobble plate 254 pivots about a support pin 256 so as to provide uniform contact with the intermediate film strip 71 and the lens shroud 22 during engagement as shown.

Figure 17:
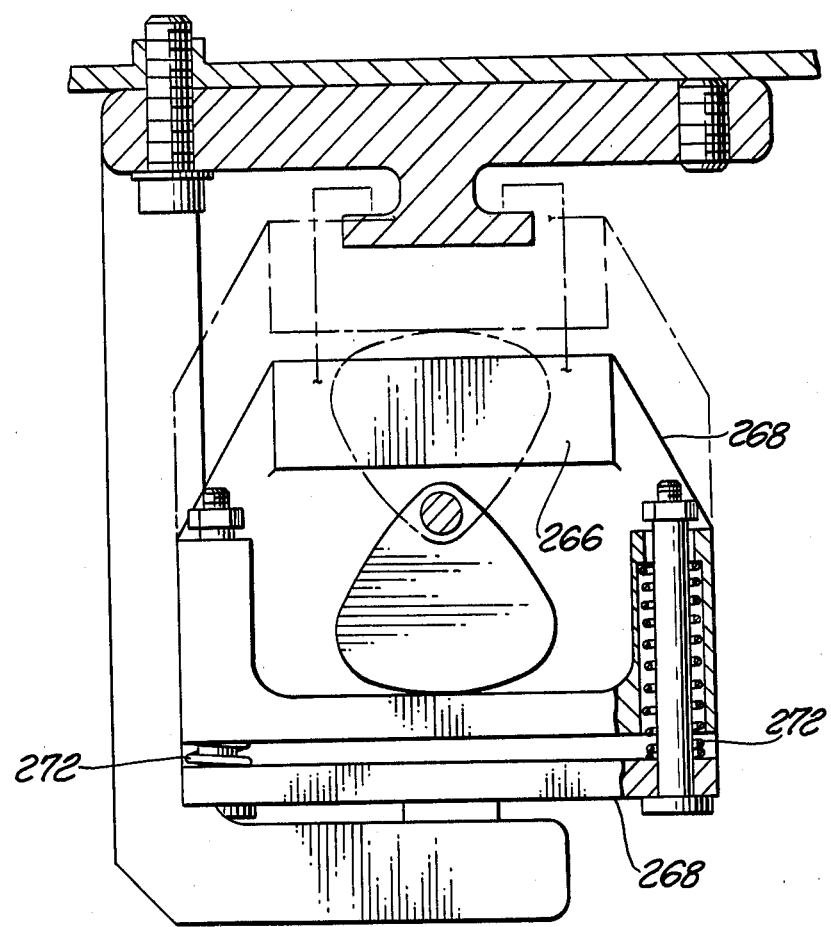
FIG. 17 is a partially sectioned side elevation of the lens shroud yoke and drive cam.

FIGS. 16 and 17 show details of the lens shroud actuation system. A shroud actuating motor 258 drives an output shaft 260 having a timing cam 262 which actuates a pair of microswitches (not shown) to transmit shaft position sensing information to the system timing and control circuit 7. At the end of the shaft 260 is a lens shroud actuating cam 264 which bears upon a shoulder 266 on a lens shroud actuating yoke 268 to raise the lens shroud 22 and which alternatively bears upon a spring loaded floating member 270 to drive the lens shroud 22 down. During downward motion the floating member 270 is driven downward, transmitting the cam force through two coiled springs 272—272 to the lens shroud yoke 268. When the lens shroud is fully seated against either the pressure element wobble plate 254 (see FIG. 16A) supporting the intermediate film 71 or alternatively the illuminator prism 192 supporting the microfiche film card 20 (FIG. 1), further downward motion ceases, and the remainder of the motion of the actuating cam 264 serves merely to compress the coupling springs 272—272. By this means, a rigid planar film support is achieved properly positioned with respect to the lens shroud 22, and the vibration problems associated with the prior art machine referred to previously are completely eliminated. This "lost motion" coupling also accommodates to different actuation distances required of the lens shroud 22 during the initial imaging and the readback operations, a feature required by setting the pressure pad 26 (FIG. 1) and the illuminator output prism 192 to different heights. The usefulness of this arrangement will be discussed subsequently with reference to FIGS. 22—22. Additionally, the lost motion mechanism accommodates to different film thicknesses and manufacturing tolerances.

Figure 24A:
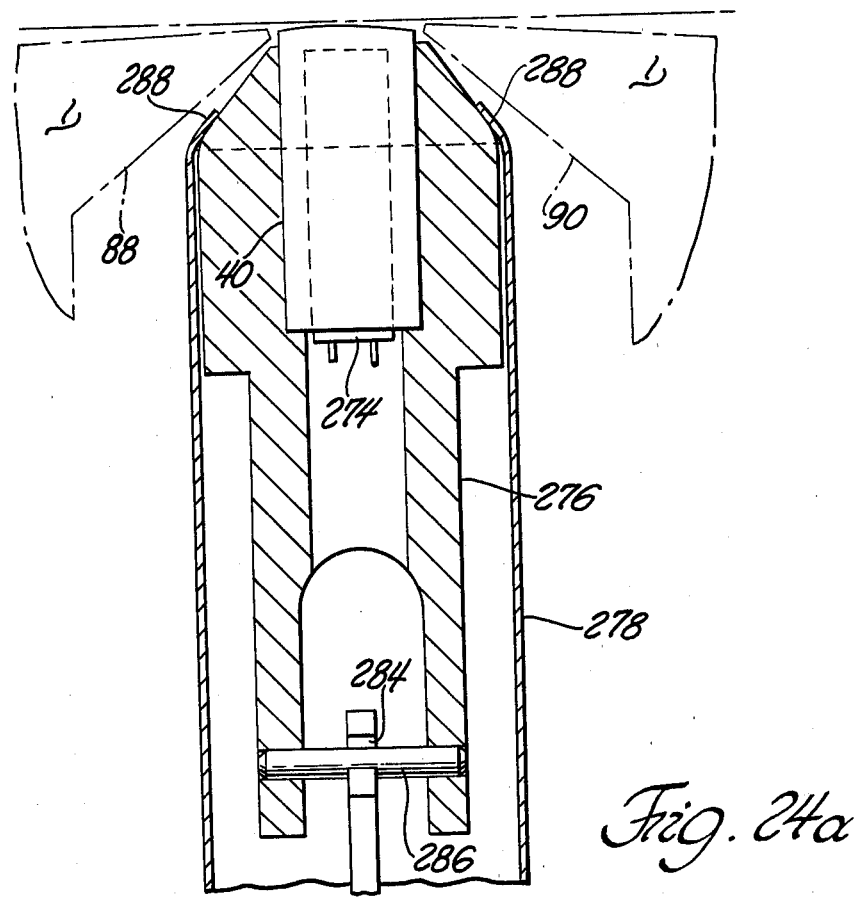
FIGS. 24 and 24A show details of the hot shoe actuation at the developing station.
Figure 24:
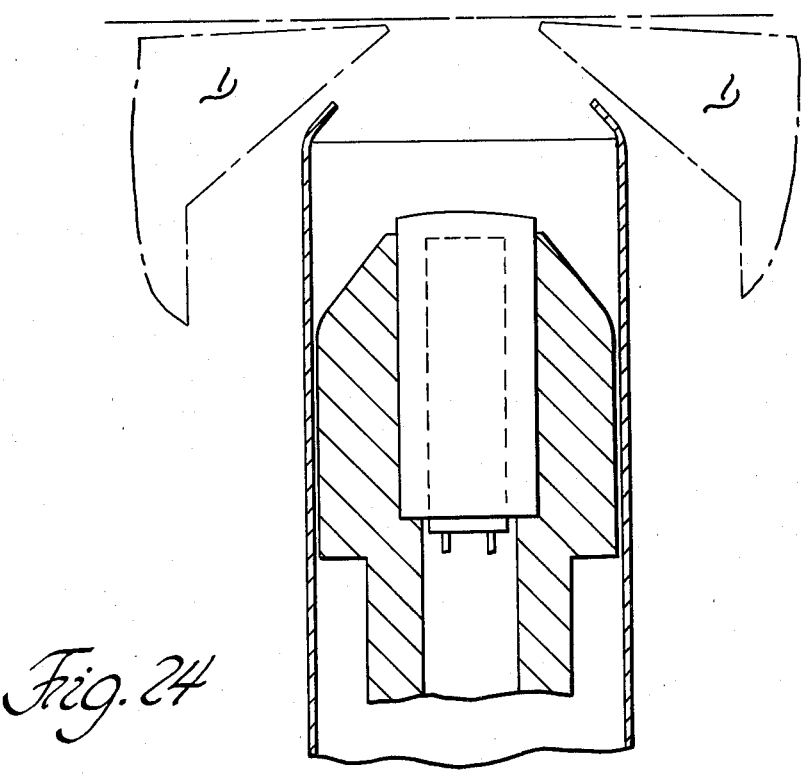

FIGS. 5, 24, and 24A show details of the hot shoe and hot shoe lifting system. An electrical heating element 274 heats the hot shoe 40, which is supported in a thermally insulated shoe carrier 276, which in turn is free to slide up and down within a hot shoe carrier housing 278. The outline of the film head 1 in proximity to the hot shoe 40 at the developing station 12 (FIG. 1) is shown in phantom outline. Actuation of the shoe lifting solenoid 40 draws down one end of a lift bar 280 pivoted about a pin 282 and having a slot 284 in its other end loosely engaging a carrier lift pin 286 to raise the shoe carrier 276 into position for developing the intermediate film 71. Two limit stops 288—288 serve to limit the upward motion.

Figure 20:
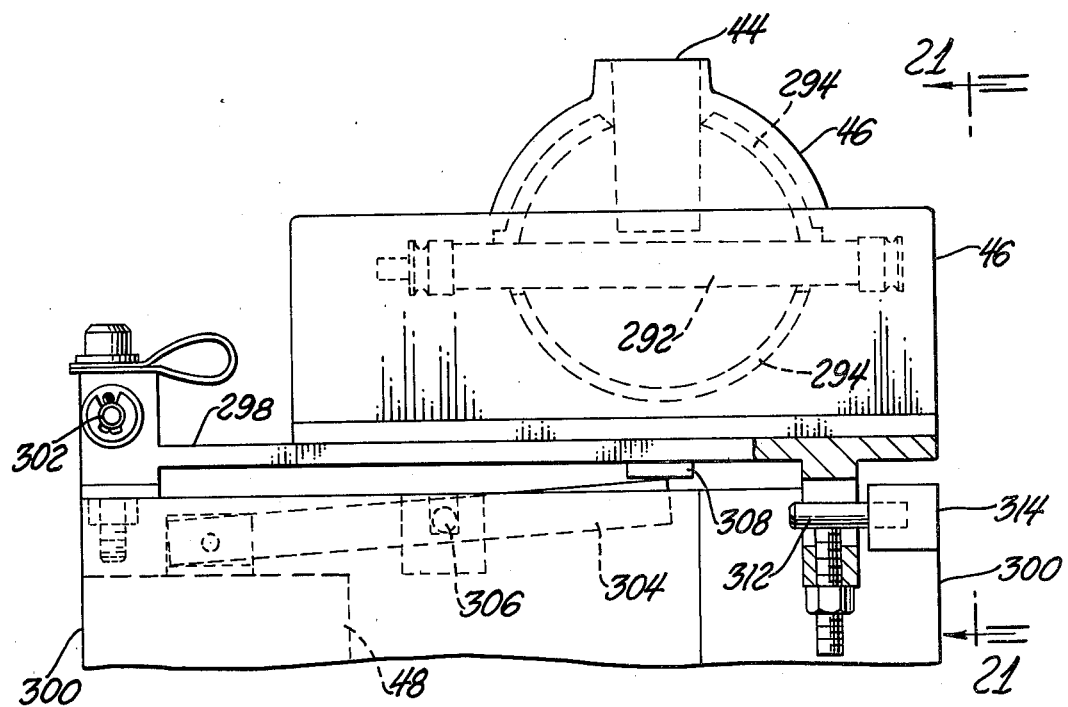
FIG. 20 is a partially sectioned side elevation of the flash housing showing details of the housing lifter and the housing limit stops.
Figure 21:
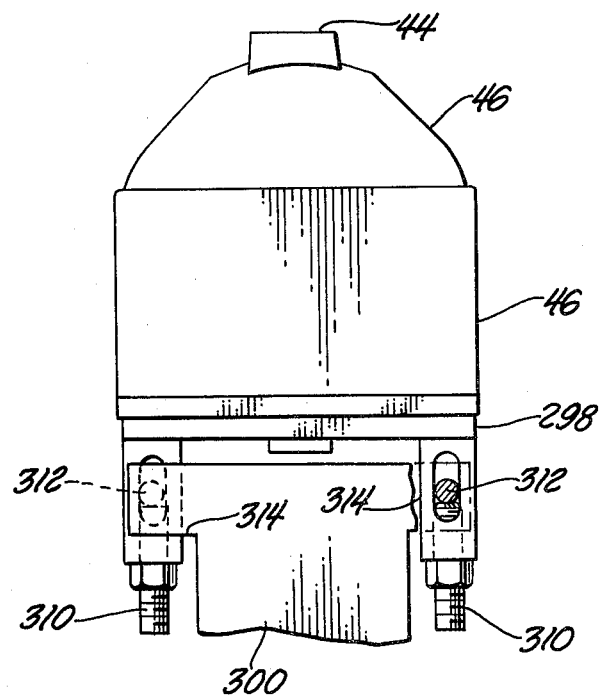
FIG. 21 is a partially sectioned rear plan view of the flash housing, showing further details of the limit stops.

FIGS. 20 and 21 show details of the actuation of the flash lifting system. A flash housing 290 containing a flash tube 292, offset hemispherical reflectors 294—294 and a collimating prism 296 is mounted on a housing base plate 298. The design of the flash housing optical system is the subject of a co-pending application by Gerald Marshall and H. Ovshinsky, entitled "Imaging Device," filed Nov. 17, 1978, Ser. No. 961,692 now U.S. Pat. No. 4,226,523, issued Oct. 7, 1980. The design of the optical elements of the flash housing system is the subject of a co-pending application by Gerald Marshall entitled "Imaging Device," filed Oct. 3, 1980, Ser. No. 193,840. The housing base plate 298 is attached to a flash housing support member 300 through a pivot 302. Actuation of the flash housing lift solenoid 48 draws down one end of a lift bar 304 which rotates about a pivot 306 to engage a boss 308 on the bottom of the housing base plate 298 thereby causing a rotational lifting of the housing 46 and housing base plate. FIGS. 20 and 21 show the housing base plate 298 in the raised position, with travel being limited by the engagement of set screws 310—310 contacting captive pins 312—312 carried by bosses 314—314 on the flash housing support 300.

Figure 19:
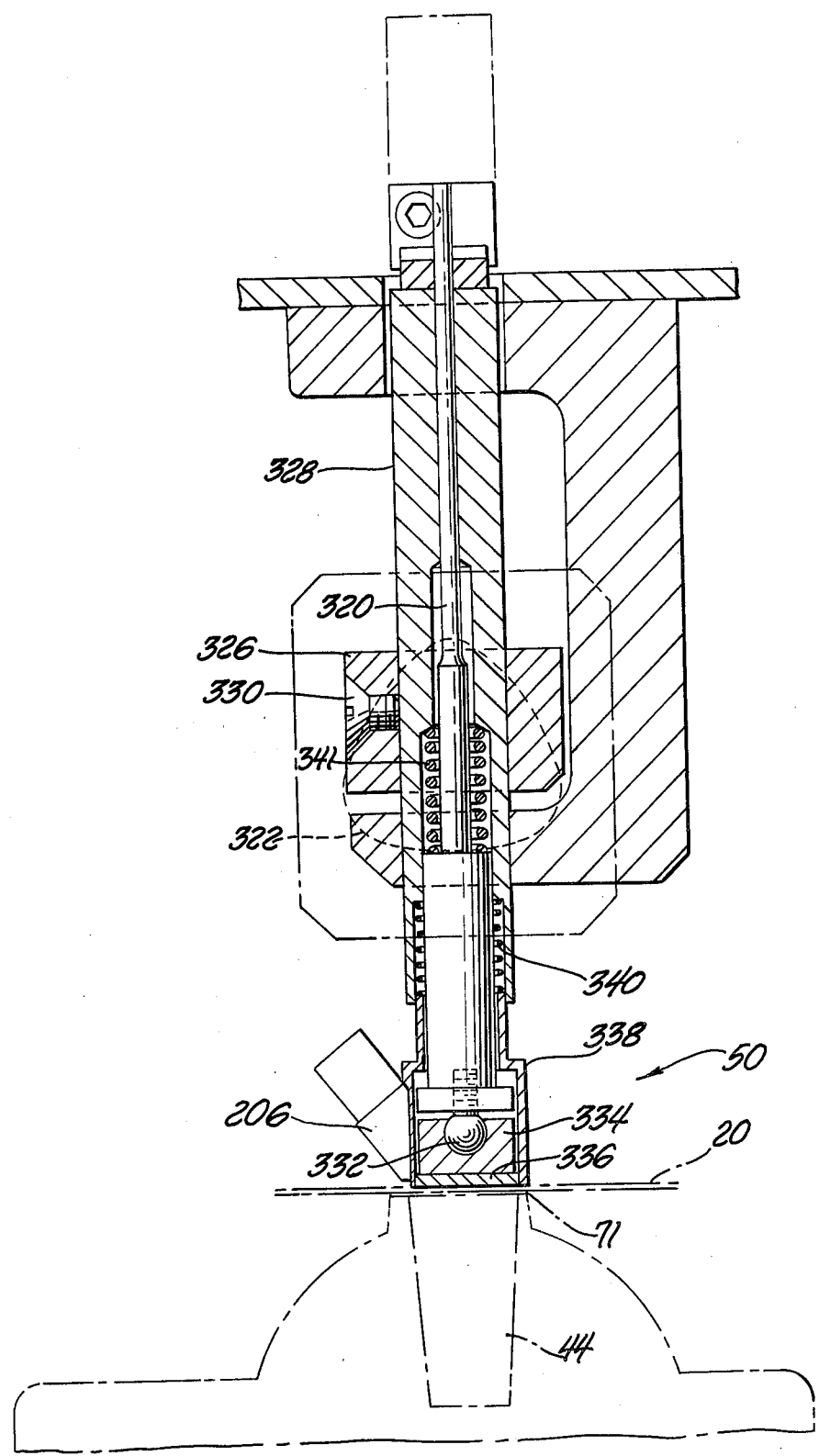
FIG. 19 is a partially sectioned side elevation of the transfer station pressure element assembly, showing details of the lost motion system and cam drive.
Figure 19A:
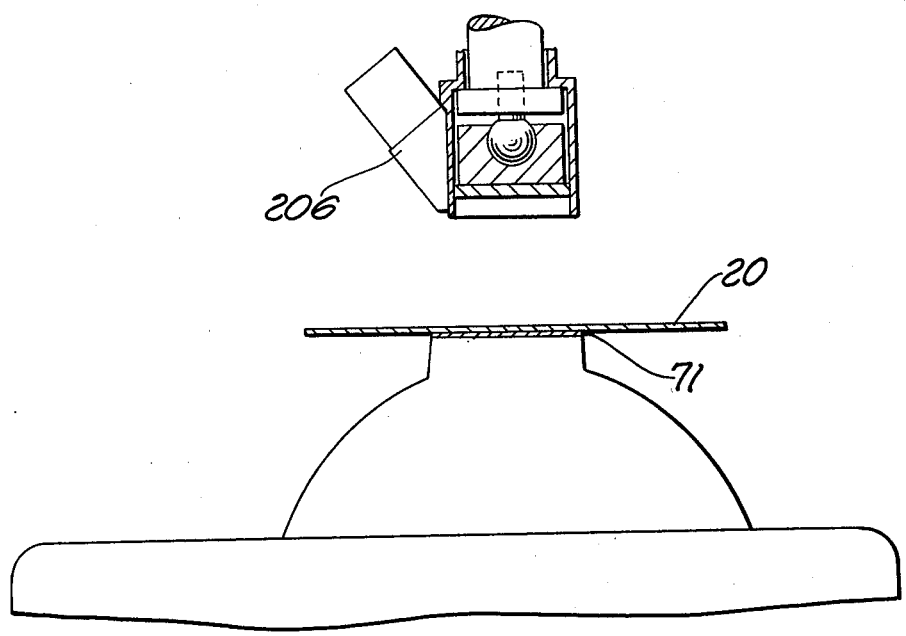
FIGS. 19A and 19B show details of the sleeve engagement of the microfiche film card at the transfer station.
Figure 19B:
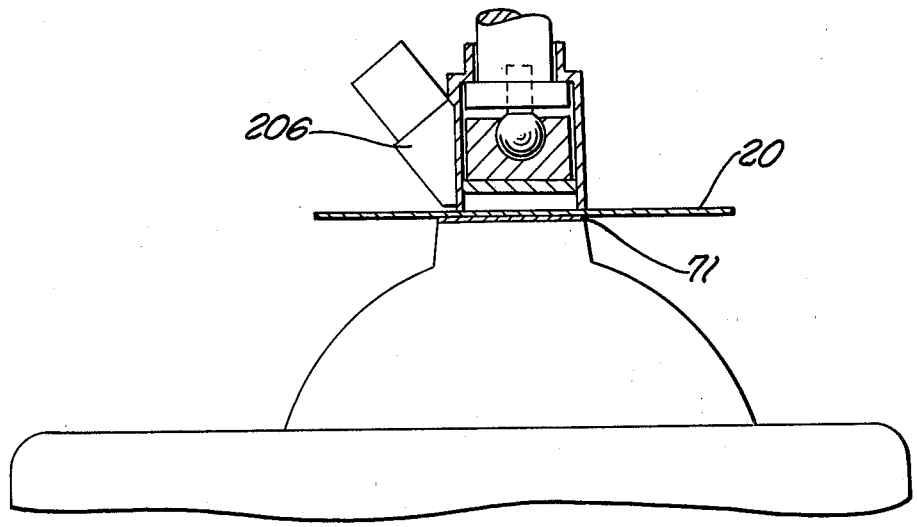

FIGS. 19, 19A and 19B show details of the transfer station backing element 20 (FIG. 1), and the backing element movement means 51. An electrical drive motor 316 drives a shaft 318 carrying two cams 320' and 322. The first cam 320' actuates position sensing microswitches (not shown) which transmit position sensing information to the system timing and control circuit 7. The second cam 322 engages a cam well 324 to drive a yoke 326 guided by a post 328. The yoke 326 holds a piston 328 captive by means of a set screw 330. Actuation of the drive motor 316 rotates the second cam 322 to raise and lower the yoke 326 and thereby the piston 328.

FIG. 19 shows the details of the piston 328, and FIGS. 19A and 19B show details of the engagement with the microfiche film card 20 and the intermediate film 71 at the transfer station 14 (FIG. 1). A central rod 320 inside the position 328 carries a swivel ball 332 attached to its lower end. The ball 332 loosely engages a rigid rectangular pressure element 334, whereby the assembly can be brought into uniform contact during image transfer. A compliant pad 336 serves to transmit pressure from the rigid pressure element 334 to the microfiche film card 20 and the intermediate film 71 in contact with the flash prism 44. During initial downward movement a loosely held rectangular sleeve 338 protrudes beyond the compliant pad 336 so as to make the initial engagement with the microfiche film card 20. This is accomplished by a weak coil spring 340 inside the piston 328, the sleeve 338 being loosely fitted so as to be allowed to tilt slightly for proper engagement upon striking the microfiche film surface. Further downward movement of the piston 328 causes the compliant pad 336 to engage the surface of the microfiche film card 20 and terminate downward movement of the piston 328. Subsequent motion of the cam 322 to urge the piston 328 in a downward direction is taken up by a second spring 340. The sleeve 338 carries the optical sensing assembly 206 used for exposure sensing.

Figure 12:
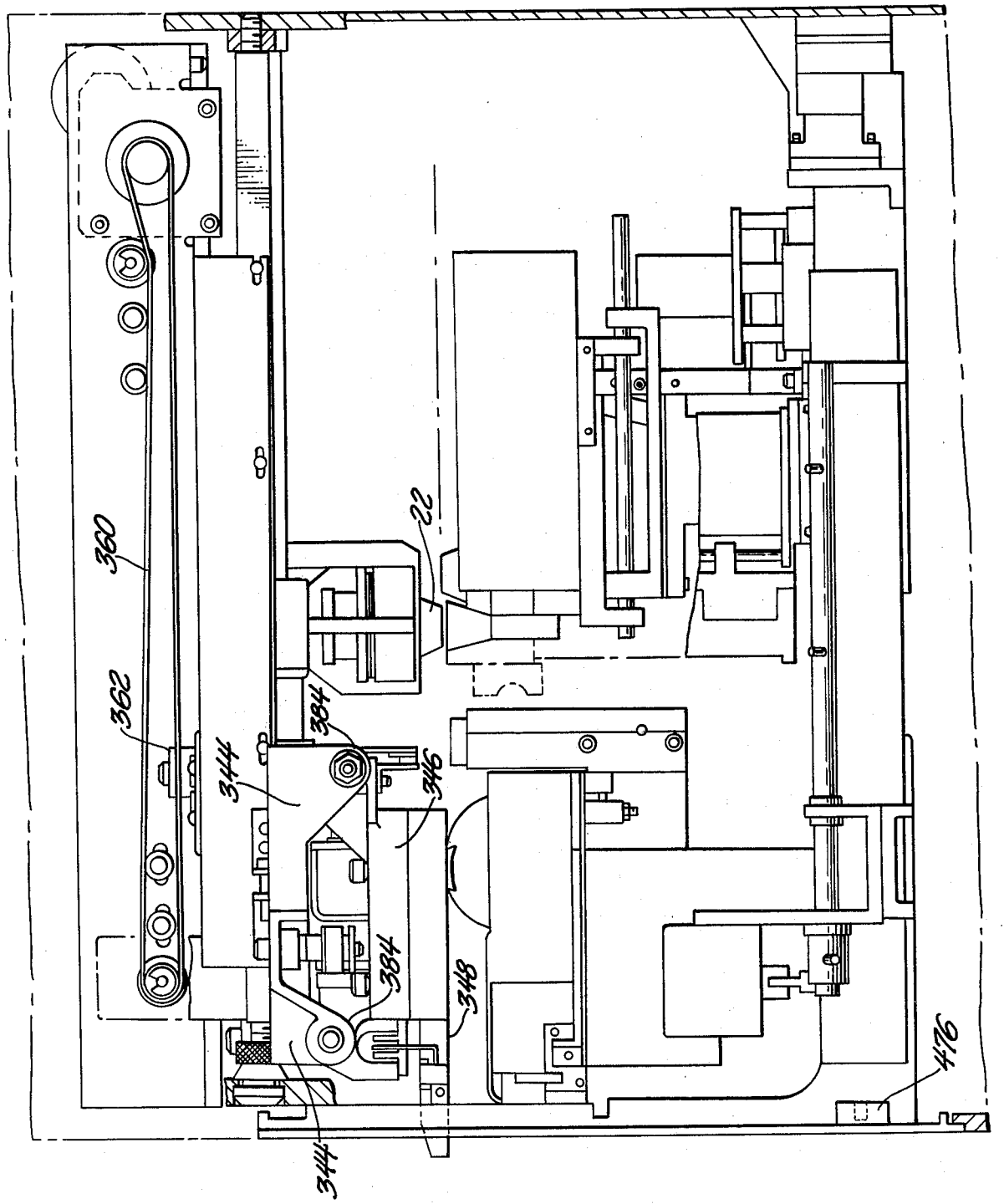
FIG. 12 is a side elevation of the drawer assembly showing a side elevation of the microfiche film carriage assembly.

FIGS. 12, 13 and 14 show details of the microfiche card positioning system. The system consists of two system support rails 178 and 180 (see also FIG. 3), an upper carriage assembly 344, and a lower carriage assembly 346 carrying a microfiche card holding tray 348.

FIG. 12 shows a side elevation of the microfiche carriage positioning system. FIG. 13 shows a top plan view of the microfiche carriage system showing a microfiche film card 20 installed in the card tray 348. FIG. 14 shows a sectioned top plan view of the lower carriage assembly 346. The microfiche carriage system serves to position a chosen frame of the microfiche film card 20 over the flash prism 44 for image transfer or alternatively over the illuminator output prism 192 for displaying a given microfiche frame on the document platform 28 (FIG. 2). An entry by the operator via the command keys 162 (FIG. 2) causes the system timing and control circuit 7 to actuate the film card positioning system of FIGS. 14, 15, and 16 to place the chosen frame at the desired station. The upper carriage assembly 344 is slideably supported on the two upper support rails 178 and 180, allowing front to rear motion. The left support rail 178 is cylindrical and passes through a support bushing 350 on the upper carriage assembly 344. The right hand support rail 180 is rectangular and contains a series of indexing notches 352 selectively engagable with a locking pawl 354. Actuation of a release solenoid 356 causes the pawl to be withdrawn from engagement with the support rail 352 leaving the entire assembly free to move from front to rear. Front to rear motion is caused by actuation of an electrical drive motor 358 which drives a pulley 360, the pulley being clamped to the upper carriage assembly 344 by means of a clamping block 362 (FIGS. 12 and 13). Front to rear motion is governed according to an optimum velocity-distance profile stored in the minicomputer in the system timing and control circuit 7. Position sensings for front to rear motion are transmitted to the system timing and control circuit by a slide wire system similar to that used to sense film head advance, and consists of a resistance strip 364 attached to the rectangular support rail 180 and a sliding contact 366 attached to the upper carriage assembly 344. Upon arrival at the addressed position, motor drive terminates and the solenoid 356 is deactivated, whereupon a return spring 478 moves the locking pawl 354 into engagement with the appropriate locking groove 352. Velocity sensings during the head motion are derived similarly from an integral tachometer in the motor 358.

FIG. 14 is a partially sectioned top plan view of the lower carriage assembly 346. The lower carriage assembly 346 moves on two lower support rails 385 and 386 supported at their ends from the upper frame assembly 344 by four bosses 384—384. Left-right motion of the lower frame is caused by actuation of an electric drive motor 368 mounted on the upper 372—372 frame assembly 344, driving a belt 370 over two pulleys carried by the upper frame assembly. Motion is imparted to the lower frame assembly 346 via a similar pulley clamp 374 attached to the lower frame assembly. A solenoid 376 actuates a locking pawl 378 in the same manner as the front to rear motion of the top carriage. Position sensings are derived from a resistance strip 380 rigidly attached to the upper carriage assembly 344 and from a sliding contact 382 attached to the lower carriage assembly 346.

FIGS. 15A–15G show details of the engagement of the intermediate microfiche film strip 71 at the various stations and illustrates the use of the compliant tension system to provide clearance. The film is clamped against payout over the payout lip 88 by the clamping blade 85 (see FIG. 5).

FIGS. 15A and 15B show the engagement of the intermediate film 71 at the imaging station. The intermediate film 71 is bowed down by a prescribed amount of exposure. FIG. 15C shows the hot shoe 42 engaged with the intermediate film at the developing station.

FIGS. 15D and 15E show the engagement of the intermediate film with the microfiche film card 20 and the film backing element 50 at the transfer station. By bowing the film 71 up, the substantial clearance between the top structure of the film head 1 and the microfiche film card tray 348, which is necessary to permit motion between stations, is accommodated, thereby allowing substantially full utilization of the peripheral area of the microfiche film card 20. Without such a feature, image transfer could not be achieved close to the edges of the film card tray 348. This accomplishes one of the objects of the invention. Alternatively the microfiche film card 20 would have to be supported completely from the top surface, implying the use of a more expensive vacuum support system or similar apparatus. An unavoidable lateral shift in the intermediate film strip 71 occurs as a result of bowing, as indicated by the arrows in FIG. 17. By making the width of the base of the lens shroud 22 equal to the width of the flash prism 44, and by making the downward film displacement during formation of the initial image equal to the upper displacement during transfer, identical lateral film shift is achieved, and possible registry error is thereby suppressed. This point is discussed in detail by H. Ovshinsky and P. Klose in their co-pending application.

FIGS. 15F and 15E show the engagement of the microfiche film during the "read" operation. The projection prism 192 does not substantially stress the microfiche film card 20 during this process. Further aspects of the compliant tensioning system with respect to prevention of film breakage, uniform development, and suppression of image registry error during the transfer operation is the subject of the aforementioned co-pending application of P. Klose and H. Ovshinsky.

FIGS. 22, 22A–22C show the pertinent clearances between elements at the imaging and transfer stations.

Figure 22:
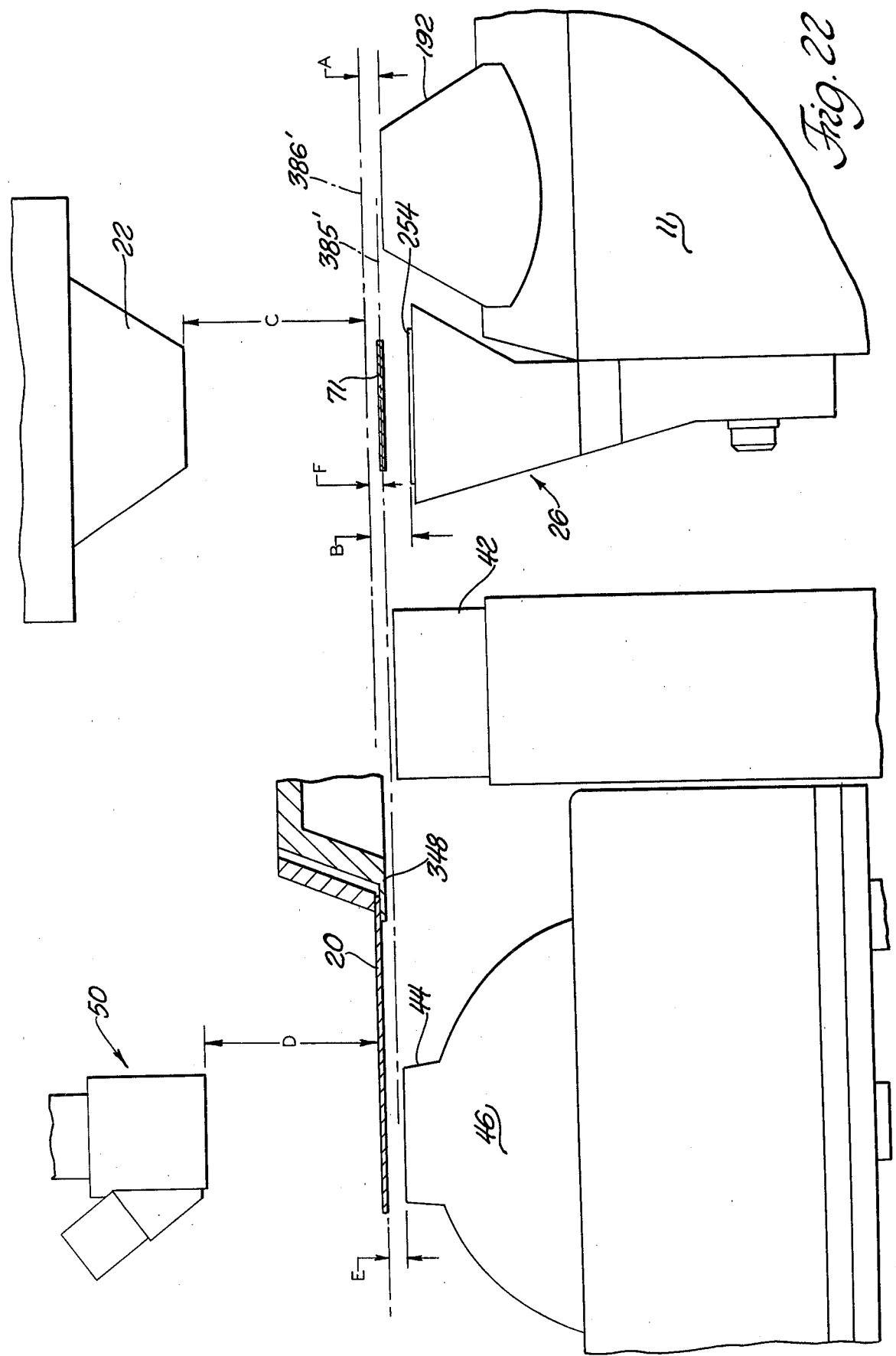
FIG. 22 is a side elevation of the microfiche film plane region between the three stations, showing relative clearances. All elements are shown in the retracted position. The microfiche film card tray is shown partially sectioned.

FIG. 22 shows the normal position of some of the system elements in the retracted position thereof, allowing unobstructed motion of the microfiche film tray 348 shown partially in FIG. 22. The dashed line 386' denotes the plane of motion of the lower face of the microfiche film card 20. In the retracted position the lens shroud standoff distance c and the backing element stand. f distance d are approximately 20 millimeters. The plane of the unstressed intermediate film 71 is a distance f below the plane of the microfiche film travel 380 by approximately 1.5 millimeters. In the retracted position, the upper surface of the flash prism 44 is at a distance of approximately 2 millimeters below the microfiche film plane 386'.

Figure 18:
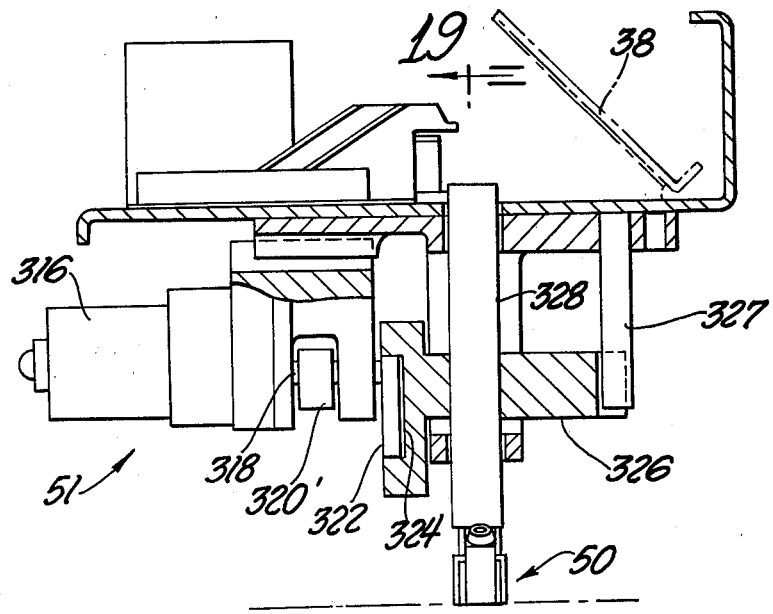
FIG. 18 is a partially sectioned front elevation of the transfer station pressure element assembly and actuating system.
Figure 22A:
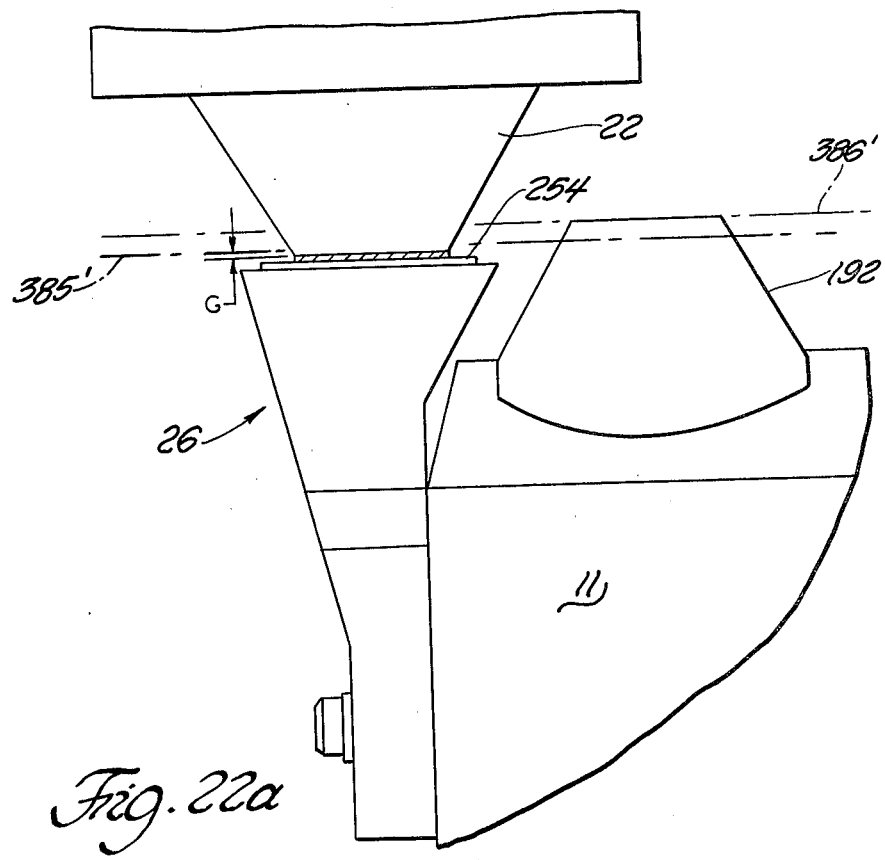
FIG. 22A is a side elevation of the vicinity of imaging region showing the intermediate film bowed down for initial imaging.

FIG. 22A shows the intermediate film bowed down a distance g corresponding to 3 millimeters, with the image station carriage 13 raised to place the output prism 192 on the microfiche plane line 386' and the image station wobble plate 254 (see FIGS. 18 and 18A) raised to a distance 3 millimeters below the microfiche film plane 386'. The film has thus been stressed downward from its unstressed position by 1.5 millimeters.

Figure 22B:
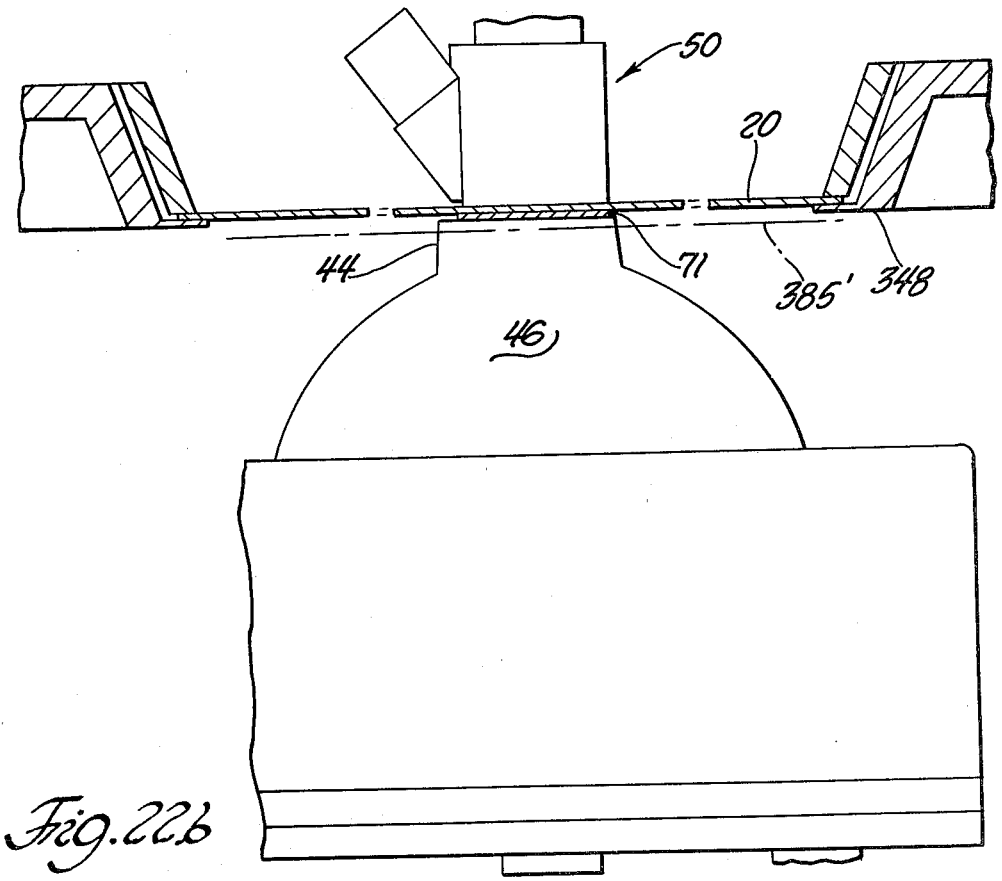
FIG. 22B is a side elevation of the flash housing region showing the intermediate film bowed up for transfer.

FIG. 22B shows the engagement at the transfer station with the flash prism 44 raised to press the intermediate film 71 into engagement with the microfiche film card 20. Here by raising the intermediate film 71 a distance of 1.5 millimeters to bring it into contact with the microfiche film card 20, an identical upward bowing of the film has been achieved, thereby suppressing the registry error problem referred to in the co-pending application by Ovshinsky and Klose.

Figure 22C:
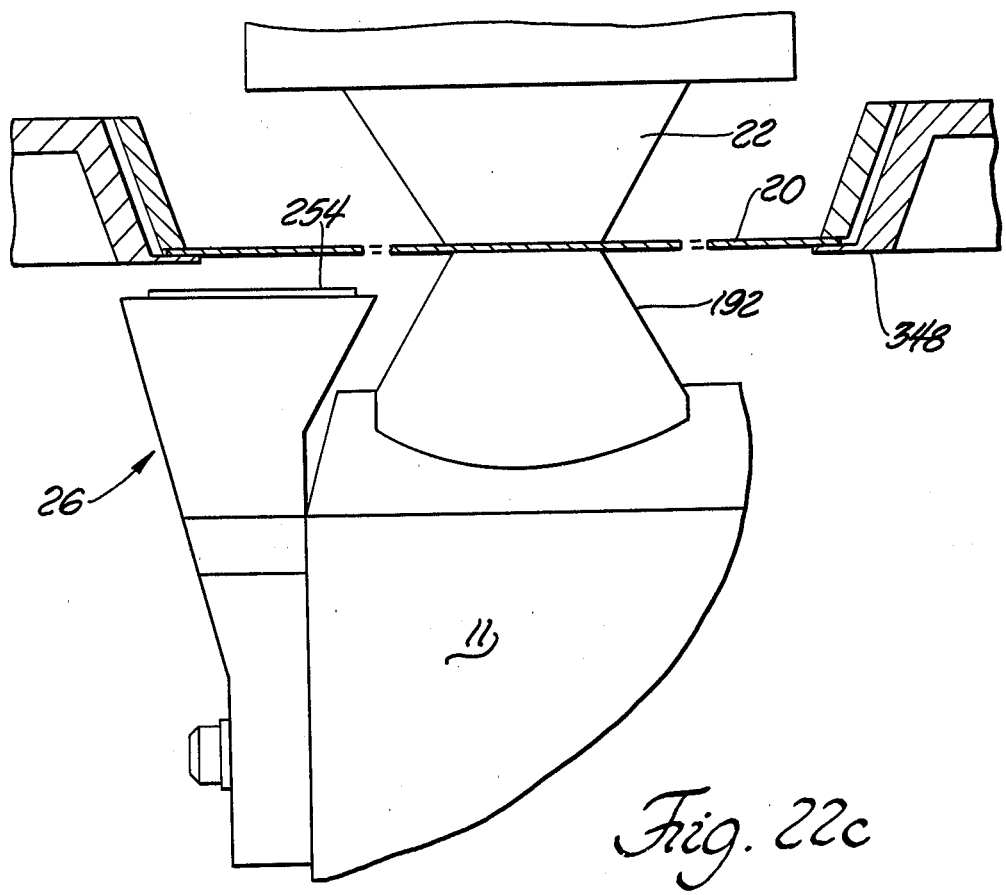
FIG. 22C is a partially sectioned side projection of the imaging station region showing the microfiche film and projection prism in contact for the read-back operation.

FIG. 22C shows the projection illuminator positioned for projecting the image of the microfiche onto the document platform 28. Here the illumination station is raised to the same height as in FIG. 22A brining the illuminator prism 192 into touching contact for back projection. Thus by bowing the intermediate film 71 down for initial imaging and by subsequently bowing it up by an identical amount at the transfer station, the imaging station backing pad 26 and the projection illuminator system 11 may be made unitary and do not require separate lift actuators, thereby achieving a substantial cost economy while maintaining proper image registry.

To achieve optimum resolution during the image transfer operation the intermediate film 71 is loaded with its emulsion side facing upwards. The microfiche film card material is of the opaque photo-developing type, and has a thickness of about 0.004 inches. (See U.S. Pat. No. 4,137,078 issued June 30, 1979 to Izu and Ovshinsky.) The active layer in such film is placed close to one surface. To achieve maximum resolution during the image transfer, the film card is inserted with the active layer down. Thus during transfer (see FIG. 22B), the active layer of the microfiche film card 20 and the emulsion layer of the intermediate film 71 are in close proximity, thereby reducing penumbra effects and maximizing resolution of the transferred image. An unavoidable consequence of this is that during the "read" operation shown in FIG. 22C, the image layer in the microfiche film card 20 is held at a standoff distance of approximately 0.004 inches below the base of the lens shroud 22 and is therefore not in the proper imaging plane for optimum focus during the "read" operation. To correct for this out-of-focus condition, the corrector lens 172 (FIGS. 1, and 3) is mechanically interposed for the read operation.

Figure 25:
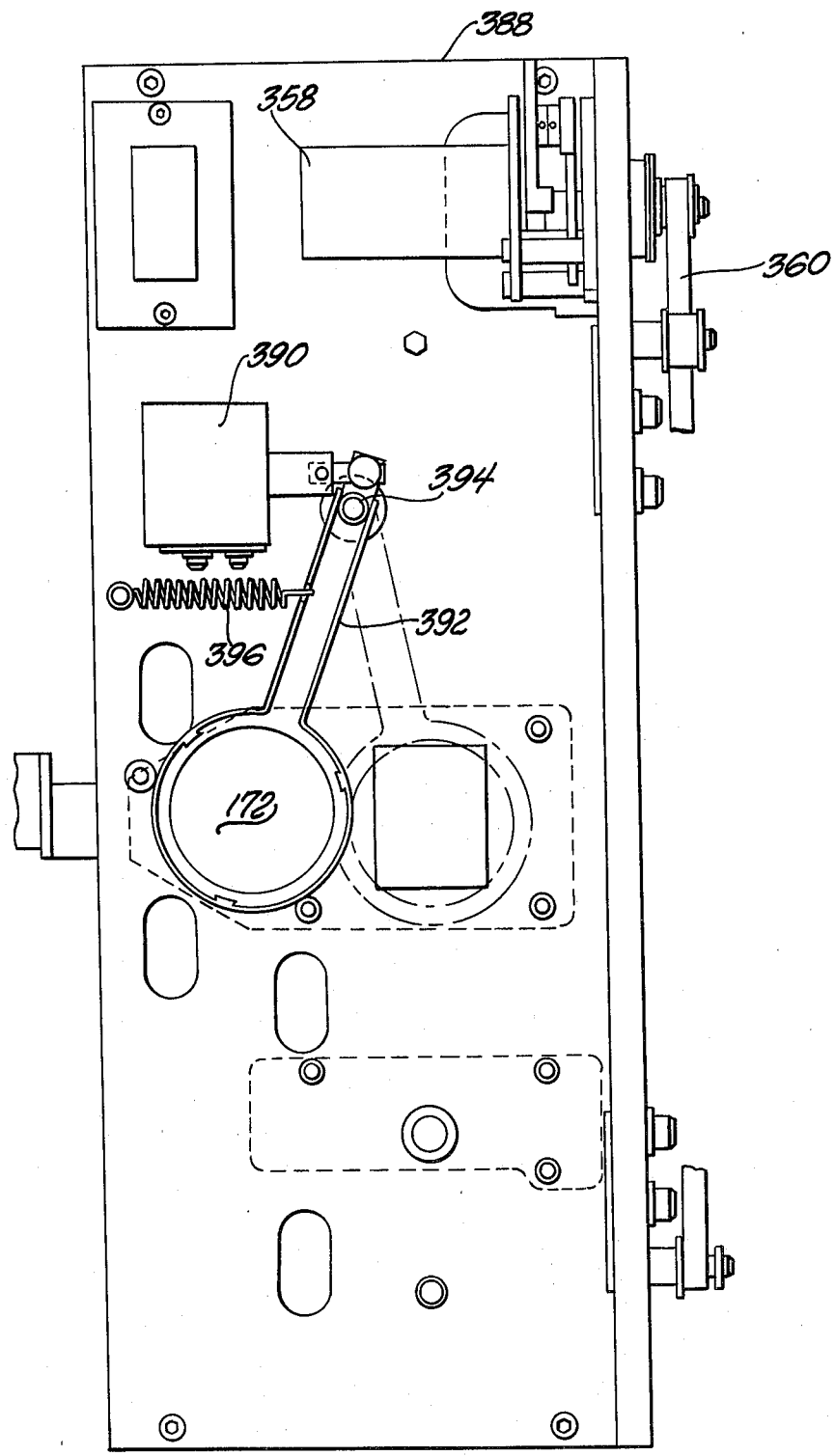
FIG. 25 is a top plan view of the corrector lens support plate, showing details of the corrector lens mounting and actuation system.

FIG. 25 is a top plan view of the lens mounting plate 388 shown in FIG. 3. A solenoid 390 actuated by the system timing and control circuit 7 for the "read" operation pulls one end of a lens support bar 392 rotatably mounted on a pivot 394. The corrector lens 172 is mounted on the end of the lens support bar 392 and is interposed to center on the optic axis of the imaging lens 21 by this operation. Termination of the sequence is carried out by de-energizing solenoid, whereupon a return spring 396 withdraws the corrector lens 172 to the retracted position shown.

A further improvement over the prior system referred to is that no mechanical shutter is necessary to govern the exposure of the intermediate film at the imaging station. The imaging sequence consists of moving the film head 1 to the imaging station 10 (FIG. 1) advancing a fresh supply of intermediate film at the imaging area, immediately triggering the pulsed fluorescent lamps 150—150 by means of an exposure pulser 34 (FIG. 1) preferably employing the idler sustaining circuit disclosed by Gary D. Lewis in U.S. Pat. No. 4,158,793. This mode of operation allows conventional fluorescent lamps to idle in a lightly sustained low luminosity condition before being activated to full brightness. The film head is immediately withdrawn out of the region of the imaging station for immediate development by the hot shoe 42. By this means, the exposure of the fresh intermediate film to ambient light leakage through the optical system is held to a sufficiently low value that no mechanical shutter is necessary, the exposure being governed completely by the pulse duration.

While for the purposes of illustration, various forms of this invention have been disclosed, other forms thereof may become apparent to those skilled in the art upon reference to this disclosure and, therefore, this invention shall be limited only by the scope of the appended claims.

I claim:

1. In a microfiche film recording system including moveable supporting means for supporting an intermediate film strip, film advancing means for advancing a selected area of said film strip into an imaging position thereon, carriage means for moving said supporting means between an imaging station including imaging light projecting means including an optical train for forming an image on a selected area of said film strip in a given imaging plane and an image transfer station including image transfer means for transferring the image on said selected area in a given transfer plane to a microfiche photographic film having a selected frame upon which said image is to be transferred, the improvement comprising a first pressure applying means at said imaging station which engages one side of the intermediate film strip at the imaging station and bows the same into said imaging plane against a backing member at said plane, a second pressure applying means at said image transfer station which engages the other side of the intermediate film strip thereat and bows the same in the opposite direction against said microfiche film backed by a backing member thereat, said backed microfiche film establishing said transfer plane, an illumination means moveable opposte said imaging station for projecting the image on a selected frame of said microfiche film backward through said optical train, said illumination means having a planar output window, additional means for moving said intermediate film strip supporting means and the strip carried thereby away from said imaging station and said illumination means opposite said imaging station, a common moving means for said first pressure applying means and said illumination means for moving the same toward and away from said imaging plane, said illumination means output window being disposed against the selected frame of said microfiche film when said additional means is operative to move said illumination means opposite said imaging station and said common moving means has moved said illumination means to a point closest to said imaging plane.

2. The apparatus as recited in claim 1 further comprising a moveable correcting lens and control and moving means for interposing said correcting lens into the optical train of said imaging means to correct for different standoff distances from said imaging means to the image layer of said intermediate film and the image layer of said microfiche film.

3. In a microfiche film recording system including moveable supporting means for supporting an intermediate film strip, carriage means for moving said supporting means between an imaging station comprising imaging means for forming on a selected area of said film strip a first image of record copy and an image transfer station where said image on said selected area is transferred to form a second image on a microfiche photographic film, means for transferring said first image to said microfiche film, means for placing said second image at said imaging station, means for illuminating said second image, said imaging means projecting a third image of said second image, the improvement comprising optical correcting means and corrector moving means, said correcting means being selectively interposeable by said corrector moving means into the optical train of said imaging means to correct for different standoff distances from said imaging means to the image layer of said first image and the image layer of said second image.

4. The apparatus as recited in claim 3, wherein said correcting means is a lens.

5. In a microfiche film recording system including a source of an image-containing light field, housing means in which said light field is directed upwardly from a lower portion of said housing means, said housing means having an interior portion isolated from external ambient light, movable intermediate film supporting means in the lower section of said interior portion of said housing means and supporting an intermediate film strip sensitive to said light field and upon a selected area of which said light field is to be directed to form an image thereon, carriage means for moving said supporting means in a generally horizontal direction in the lower portion of said housing means between an imaging station where said selected area of said film strip is to receive said light field and an image transfer station where said image on said selected area thereof is to be transferred to a microfiche photographic film which is not sensitive to said light field, microfiche film support means at said image transfer station and light direction means at said image transfer station for directing a flash of a relatively high intensity light through the selected imaged area of said intermediate film and upon a selected frame of said microfiche film to image the same, the improvement comprising a folded optical system in the upper portion of said housing means for relaying said upwardly directed image-containing light field to the selected area of said intermediate film strip, said folded optical system including a first downwardly facing and inclined reflecting surface which receives said light field directed upwardly in said housing means and directs the same generally horizontally to a second downwardly facing oppositely inclined reflecting surface in said interior portion of said housing means and which reflects said light field downwardly where the light field is directed upon the selected area of said intermediate film strip, said light directing means at said image transfer station being below said intermediate film supporting means to direct said flash of high intensity light upwards through said intermediate film strip, said microfiche film supporting means being above said intermediate film supporting means at said image transfer station.

6. In a microfiche film recording system including a source of an image-containing light field, housing means in which said light field is directed upwardly from a lower portion of said housing means, said housing means having an interior portion isolated from external ambient light, movable intermediate film supporting means in the lower section of said interior portion of said housing means and supporting an intermediate film strip sensitive to said light field and upon a selected area of which said light field is to be directed to form an image thereon, carriage means for moving said supporting means in a generally horizontal direction in the lower portion of said housing means between an imaging station where said selected area of said film strip is to receive said light field and an image transfer station where said image on said selected area thereof is to be transferred to a microfiche photographic film which is not sensitive to said light field, microfiche film support means at said image transfer station and light direction means at said image transfer station for directing a flash of a relatively high intensity light through the selected image area of said intermediate film and upon a selected frame of said microfiche film to image the same, the improvement comprising a folded optical system in the upper portion of said housing means for relaying said upwardly directed image-containing light field to the selected area of said intermediate film strip, said folded optical system including a first downwardly facing and inclined reflecting surface which receives said light field directed upwardly in said housing means and directs the same generally horizontally to a second downwardly facing oppositely inclined reflecting surface in said interior portion of said housing means and which reflects said light field downwardly where the light is directed upon the selected area of said intermediate film strip, said carriage means moving said intermediate film strip between said imaging station and said image transfer station in a direction transverse to the spacing direction of said first and second oppositely inclined reflecting surfaces.

7. In a microfiche film recording system including a source of an image-containing light field, housing means in which said light field is directed upwardly from a lower portion of said housing means, a horizonal support surface associated with said housing means and in line with a lower portion of said housing means and upon which a sheet containing an image can be placed, said housing means including an access opening at the front of the housing means through which an operator of the front thereof can place said sheet by insertion through the access opening and through which he can see the sheet upon said platform, said housing means having an interior portion isolated from external ambient light, movable intermediate film supporting means in the lower section of said interior portion of said housing means and supporting an intermediate film strip sensitive to said light field and upon a selected area of which said light field is to be directed to form an image thereon, carriage means for moving said supporting means in a generally horizontal direction in the lower portion of said housing means between an imaging station where said selected area of said film strip is to receive said light field and an image transfer station where said image on said selected area thereof is to be transferred to a microfiche photographic film which is not sensitive to said light field, microfiche film support means at said image transfer station and light direction means at said image transfer station for directing a flash of a relatively high intensity light through the selected imaged area of said intermediate film and upon a selected frame of said microfiche film to image the same, the improvement comprising a folded optical system in the upper protion of said housing means for relaying said upwardly directed image-containing light field to the selected area of said intermediate film strip, said folded optical system including a first downwardly facing and inclined reflecting surface which receives said light field directed upwardly in said housing means and directs the same generally horizontally to a second downwardly facing oppositely inclined reflecting surface in said interior portion of said housing means and which reflects said light field downwardly where the light field is directed upon the selected area of said intermediate film strip, said source of said image-containing light field including lighting means for directing light through or toward said support surface to project a field of light upwadly through or downwardly upon said sheet so that an upwardly directed, image-containing light field is projected upon said first downwardly facing reflecting surface, said first and second reflecting surfaces being spaced apart in a direction parallel to the front of said housing means, and said carriage means being arranged to move said intermediate film supporting means in a front to rear direction in said housing means.

8. The recording system of claim 5, 6, or 7 wherein said carriage means and said intermediate film supporting means are mounted in a pull-out drawer mounted for movement between a retracted position within said housing means and an extended position where it projects from said housing means.

9. The recording system of claim 7 wherein said carriage means and said intermediate film supporting means are mounted in a pull-out drawer mounted for movement between a retracted position within said housing means and an extended position where it projects from the front of said housing means when moved in a direction parallel to said front to rear direction.

10. In a microfiche film recording system including movable supporting means for supporting an intermediate filmstrip, film advancing means for advancing a selected area of filmstrip into an imaging position thereon, carriage means for moving said supporting means between an imaging station including imaging light projecting means including an optical train for forming an image on a selected area of said filmstrip in a given imaging plane and an image transfer station including image transfer means for transferring said image on said selected area in a given transfer plane to a microfiche photographic film having a selected frame upon which said image is to be transferred, the improvement comprising:

microfiche film support means at said image transfer station which covers the peripheral portion of said microfiche film on the side thereof facing said intermediate filmstrip at said transfer station so that the plane of said microfiche film is spaced a substantial distance from the intermediate filmstrip in its unbowed condition;

releasable strip holding means for fixing the position of said intermediate filmstrip on only one lateral side of said selected area thereof;

means for applying compliant tension on the opposite lateral side of said selected area so that any given degree of bowing of a selected area of said filmstrip will cause the same longitudinal shifting thereof;

a first backing member disposed at said imaging station along said imaging plane;

a second backing member disposed at said transfer station;

a first pressure applying means which engages the selected area to be imaged of the intermediate filmstrip at the imaging station and bows the same into said imaging plane, against said first backing member;

a second pressure applying means which engages the intermediate film at the image transfer station and bows the same against said microfiche film backed by said second backing member, said backed-up microfiche film establishing said transfer plane, said image plane and said transfer plane being spaced the same distance from the unbowed portion of said intermediate film, so that there is equal longitudinal shifting of said intermediate film, said second pressure applying means including a movable planar optically transparent window disposed to pressingly engage said filmstrip into planar one of said configuration at said transfer station, one of said second backing member and said second pressure applying means being swivel supported, said second backing member including coplanar support regions configured to pressingly engage at least peripheral regions of said filmstrip into planar configuration across said second backing member.

11. The microfiche film recording system of claim 10 wherein said second backing member is swivel supported.

12. In a microfiche film recording system including movable supporting means for supporting an intermediate filmstrip, film advancing means for advancing a selected area of filmstrip into an imaging position thereon, carriage means for moving said supporting means between an imaging station including light projecting means including an optical train for forming an image on a selected area of said filmstrip in a given imaging plane and an image transfer station including image transfer means for transferring said image on said selected area in a given transfer plane to a microfiche photographic film having a selected frame upon which said image is to be transferred, the improvement comprising:

microfiche film support means at said image transfer station which covers the peripheral portion of said microfiche film on the side thereof facing said intermediate filmstrip at said transfer station so that the plane of said microfiche film is spaced a substantial distance from the intermediate filmstrip in its unbowed condition;

releasable strip holding means for fixing the position of said intermediate filmstrip on only one lateral side of said selected area thereof;

means for applying compliant tension on the opposite lateral side of said selected area so that any given degree of bowing of a selected area of said filmstrip will cause the same longitudinal shifting thereof;

a first backing member disposed at said imaging station along said imaging plane;

a second backing member disposed at said transfer station;

a first pressure applying means which engages the selected area to be imaged of the intermediate filmstrip at the imaging station and bows the same into said imaging plane, against said first backing member;

a second pressure applying means which engages the intermediate film at the image transfer station and bows the same against said microfiche film backed by said second backing member, said backed-up microfiche film establishing said transfer plane, said image plane and said transfer plane being spaced the same distance from the unbowed portion of said intermediate film, so that there is equal longitudinal shifting of said intermediate film, said first pressure applying means including a movable frame, said frame configured to pressingly engage peripheral regions of said filmstrip into planar configuration, said frame disposed at said imaging station about the axis of said optical train, said frame configured to allow passage of light to form said image on said selected area of said filmstrip, one of said first backing member and said first pressure applying means being swivel supported, said first backing member including coplanar support regions configured to pressingly engage at least the peripheral regions of said filmstrip into planar configuration across said first backing member.

13. The microfiche film recording system of claim 12 wherein said first backing member is swivel supported.

14. In a microfiche film recording system including movable supporting means for supporting an intermediate filmstrip, film advancing means for advancing a selected area of filmstrip into an imaging position thereon, carriage means for moving said supporting means between an imaging station including imaging light projecting means including an optical train for forming an image on a selected area of said filmstrip in a given imaging plane and an image transfer station including image transfer means for transferring said image on said selected area in a given transfer plane to a microfiche photographic film having a selected frame upon which said image is to be transferred, the improvement comprising:

microfiche film support means at said image transfer station which covers the peripheral portion of said microfiche film on the side thereof facing said intermediate filmstrip at said transfer station so that the plane of said microfiche film is spaced a substantial distance from the intermediate filmstrip in its unbowed condition;

releasable strip holding means for fixing the position of said intermediate filmstrip on only one lateral side of said selected area thereof;

means for applying compliant tension on the opposite lateral side of said selected area so that any given degree of bowing of a selected area of said filmstrip will cause the same longitudinal shifting thereof;

a first backing member disposed at said imaging station along said imaging plane;

a second backing member disposed at said transfer station;

a first pressure applying means which engages the selected area to be imaged of the intermediate filmstrip at the imaging station and bows the same into said imaging plane, against said first backing member;

a second pressure applying means which engages the intermediate film at the image transfer station and bows the same against said microfiche film backed by said second backing member, said backed-up microfiche film establishing said transfer plane, said image plane and said transfer plane being spaced the same distance from the unbowed portion of said intermediate film, so that there is equal longitudinal shifting of said intermediate film, said first pressure applying means including a movable frame, said frame configured to pressingly engage peripheral regions of said filmstrip into planar configuration, said frame disposed at said imaging station about the axis of said optical train, said frame configured to allow passage of light to form said image on said selected area of said filmstrip, one of said first backing member and said first pressure applying means being swivel supported, said first backing member including coplanar support regions configured to pressingly engage at least the peripheral regions of said filmstrip into planar configuration across said first backing member.

15. The microfiche film recording system of claim 14 wherein said second backing member is swivel supported.

16. The microfiche film recording system of claim 14 wherein said first backing member is swivel supported.

* * * * *

UNITED STATES PATENT AND TRADEMARK OFFICE
CERTIFICATE OF CORRECTION

PATENT NO. : 4,355,890
DATED : October 26, 1982
INVENTOR(S) : Peter H. Klose et al.

It is certified that error appears in the above—identified patent and that said Letters Patent are hereby corrected as shown below:

Column 1, line 14, delete "ad" and insert --and--.
Column 1, line 18, delete "intermediae" and insert --intermediate--.
Column 7, line 3, delete "leans" and insert --lens--.
Column 7, line 58, delete "involed" and insert --involved--.
Column 8, line 3, delete "as" and insert --is--.
Column 8, line 25, delete "casette" and insert --cassette--.
Column 8, line 53, delete "P" and insert --P.--.
Column 9, line 34, delete "standarized" and insert --standardized--.
Column 9, line 67, delete "preferred" and insert --referred--.
Column 10, line 66, delete "detects" and insert --detents--.
Column 11, line 24, delete "having" and insert --giving--.

UNITED STATES PATENT AND TRADEMARK OFFICE
CERTIFICATE OF CORRECTION

PATENT NO. : 4,355,890

DATED : October 26, 1982

INVENTOR(S) : Peter H. Klose et al.

It is certified that error appears in the above—identified patent and that said Letters Patent are hereby corrected as shown below:

```
     Column 12, line 33, delete "240'" and insert --248'--.
     Column 13, line 9, delete "22-22" and insert --22, 22A
and 22C--.
     Column 15, line 29, delete "of" and insert --for--.
     Column 16, line 8, delete "stand. f" and insert
--standoff--.
     Column 16, line 36, delete "brining" and insert
--bringing--.
     Claim 1, column 17, line 62, delete "opposte" and insert
--opposite--.
     Claim 6, column 19, line 35, delete "image" and insert
--imaged--.
     Claim 7, column 20, line 18, delete "protion" and insert
--portion--.
     Claim 7, column 20, line 32, delete "upwadly" and insert
--upwardly--.
```

Signed and Sealed this

Second Day of August 1983

[SEAL]

Attest:

GERALD J. MOSSINGHOFF

Attesting Officer

Commissioner of Patents and Trademarks